United States Patent
Wang et al.

(10) Patent No.: US 10,592,111 B1
(45) Date of Patent: Mar. 17, 2020

(54) ASSIGNMENT OF NEWLY ADDED DATA STORAGE DRIVES TO AN ORIGINAL DATA STORAGE DRIVE PARTNERSHIP GROUP AND A NEW DATA STORAGE DRIVE PARTNERSHIP GROUP IN A MAPPED RAID (REDUNDANT ARRAY OF INDEPENDENT DISKS) SYSTEM

(71) Applicant: EMC IP Holding Company LLC, Hopkinton, MA (US)

(72) Inventors: Sheng Wang, Beijing (CN); Jibing Dong, Beijing (CN); Geng Han, Beijing (CN); Xinlei Xu, Beijing (CN); Jian Gao, Beijing (CN); Sun Ree, Beijing (CN); Michael Wahl, Bulverde, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 234 days.

(21) Appl. No.: 15/662,742

(22) Filed: Jul. 28, 2017

(51) Int. Cl.
*G06F 11/00* (2006.01)
*G06F 3/06* (2006.01)

(52) U.S. Cl.
CPC .......... *G06F 3/0607* (2013.01); *G06F 3/0611* (2013.01); *G06F 3/0619* (2013.01)

(58) Field of Classification Search
CPC ........... G06F 11/1092; G06F 2212/262; G06F 2211/1026; G06F 2211/1004; G06F 2220/415
See application file for complete search history.

(56) References Cited

U.S. PATENT DOCUMENTS

| | | |
|---|---|---|
| 5,579,475 A | 11/1996 | Blaum et al. |
| 5,758,118 A | 5/1998 | Choy et al. |
| 5,875,457 A | 2/1999 | Shalit |
| 6,567,889 B1 | 5/2003 | DeKoning et al. |
| 6,857,059 B2 | 2/2005 | Karpoff et al. |
| 6,901,478 B2 | 5/2005 | Bak et al. |
| 7,111,117 B2 | 9/2006 | Franklin et al. |
| 7,409,625 B2 | 8/2008 | Corbett et al. |

(Continued)

OTHER PUBLICATIONS

Blaum, et al., "EVENODD: An Optical Scheme for Tolerating Double Disk Failures in RAID Architectures", RAID Architectures: IBM Research Report, RJ 9506, Sep. 1993, pp. 245-254.

(Continued)

*Primary Examiner* — Christopher S McCarthy
(74) *Attorney, Agent, or Firm* — BainwoodHuang

(57) ABSTRACT

Technology within a mapped RAID (Redundant Array of Independent Disks) data storage system for avoiding wasted capacity in a hybrid array of data storage drives. Drives from a set of new drives may be added to an original partnership group of drives such that the number of highest capacity drives in the original partnership group remains or is made to be at least as large as a minimum number of drives required to provide RAID data protection. Drives may also be added to the original partnership group such that the number of highest capacity drives in a newly created partnership group is also at least as large as the minimum number of drives required to provide RAID data protection. The minimum required number of drives may be equal to or greater than the total number of drive extents indicated by each RAID extent in a RAID mapping table.

20 Claims, 12 Drawing Sheets

(56) References Cited

U.S. PATENT DOCUMENTS

| | | | |
|---|---|---|---|
| 8,316,288 B2 | 11/2012 | Nowoczynski et al. | |
| 8,463,992 B2 | 6/2013 | Kelton et al. | |
| 8,914,578 B2* | 12/2014 | DeNeui | G06F 3/0607 |
| | | | 711/114 |
| 9,417,822 B1 | 8/2016 | Ballance | |
| 9,632,704 B2* | 4/2017 | Gensler, Jr. | G06F 3/0665 |
| 9,641,615 B1* | 5/2017 | Robins | H04L 67/1097 |
| 10,126,988 B1* | 11/2018 | Han | G06F 3/0604 |
| 10,229,022 B1* | 3/2019 | Gao | G06F 11/2041 |
| 2004/0260967 A1 | 12/2004 | Guha et al. | |
| 2006/0075283 A1 | 4/2006 | Hartung et al. | |
| 2008/0256427 A1 | 10/2008 | He et al. | |
| 2009/0300315 A1* | 12/2009 | Agombar | G06F 3/0608 |
| | | | 711/170 |
| 2011/0145535 A1 | 6/2011 | Kusama et al. | |
| 2012/0137065 A1 | 5/2012 | Odenwald et al. | |
| 2015/0019807 A1* | 1/2015 | Malkin | G06F 3/0644 |
| | | | 711/114 |
| 2019/0129815 A1* | 5/2019 | Gao | G06F 11/2094 |

OTHER PUBLICATIONS

Miller, Scott A., "Comparing RAID 10 and Raid 01", SMB IT Journal; Jul. 30, 2014; <<http://www.smbitjournal.com/2014/07/comparing-raid-10-and-raid-01/>>article accessed Mar. 21, 2017, 6 pages.

Patterson, et al., "A Case for Redundant Arrays of Inexpensive Disks (RAID)", Proceedings of the 1988 ACM SIGMOD International Conference on Management of Data, ACM, 1988, pp. 109-116.

Perumal, et al., "A Tutorial on RAID Storage Systems", CS04-05-00. May 6, 2004. Data Network Architectures Group. Department of Computer Science. University of Capetown, 23 pages.

"Logical Block Addressing", DEW Associates Corporation, 1995-2002; <<http://www.dewassoc.com/kbase/hard_drives/lba.htm>>article was accessed on Sep. 6, 2017, 2 pages.

* cited by examiner

| | Disk Type A. 3TB | Disk Type B: 2TB | Disk Type C: 1TB | Disk Type D: 500GB |
|---|---|---|---|---|
| Number in Original Partnership Group | 5 | 30 | 10 | 10 |
| Number in Set of New Data Storage Drives | 7 | 10 | 10 | 10 |

TABLE 900

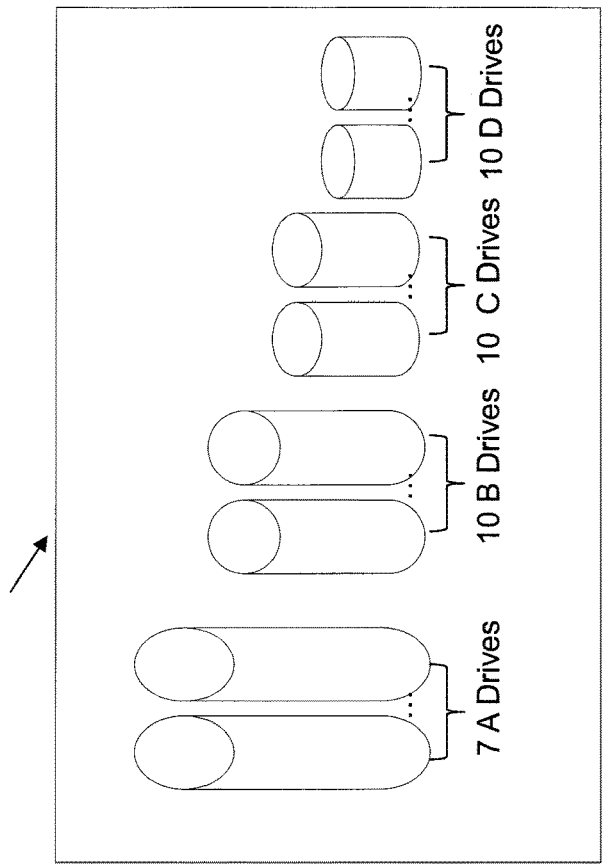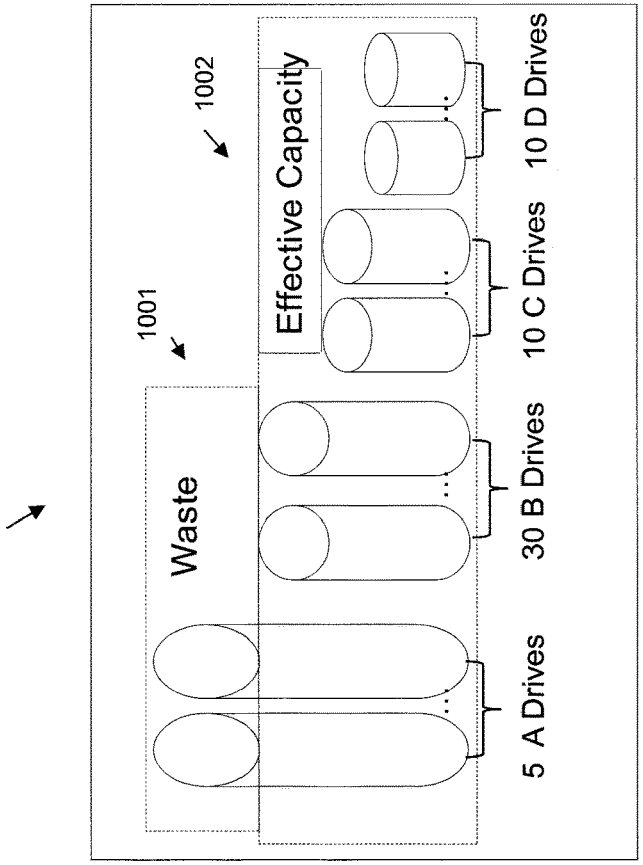
Fig. 10

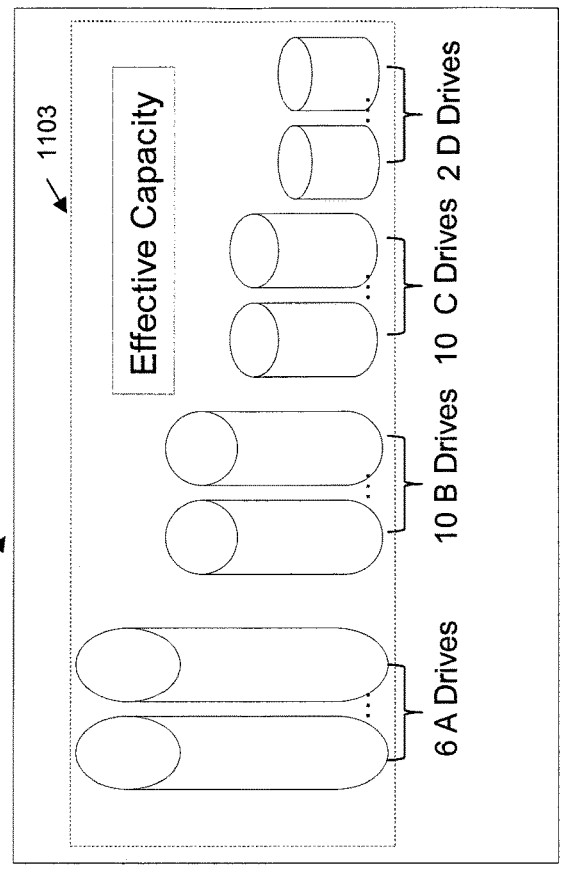
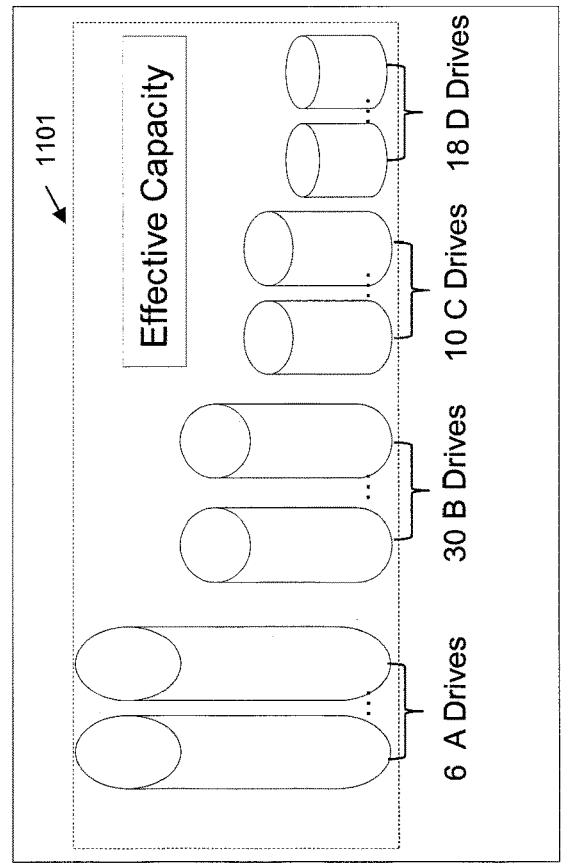
Fig. 11

ASSIGNMENT OF NEWLY ADDED DATA STORAGE DRIVES TO AN ORIGINAL DATA STORAGE DRIVE PARTNERSHIP GROUP AND A NEW DATA STORAGE DRIVE PARTNERSHIP GROUP IN A MAPPED RAID (REDUNDANT ARRAY OF INDEPENDENT DISKS) SYSTEM

TECHNICAL FIELD

The present disclosure relates generally to intelligent data storage systems that provide RAID (Redundant Array of Independent Disks) technology, and more specifically to technology for selectively assigning data storage drives from a set of newly added data storage drives to an original data storage drive partnership group and a new data storage drive partnership group in a mapped RAID system.

BACKGROUND

Data storage systems are arrangements of hardware and software that typically include multiple storage processors coupled to arrays of non-volatile data storage devices, such as magnetic disk drives, electronic flash drives, and/or optical drives. The storage processors service host I/O operations received from host machines. The received I/O operations specify one or more storage objects (e.g. logical disks or "LUNs") that are to be written, read, created, or deleted. The storage processors run software that manages incoming I/O operations and performs various data processing tasks to organize and secure the host data that is received from the host machines and then stored on the non-volatile data storage devices.

Some existing data storage systems have provided traditional RAID (Redundant Array of Independent Disks) technology. As it is generally known, traditional RAID is a data storage virtualization/protection technology that combines multiple physical drives into a single logical unit to provide data redundancy and/or performance improvement. Data may be distributed across the drives in one of several ways, referred to as RAID levels, depending on the required levels of redundancy and performance. Some RAID levels employ data striping ("striping") to improve performance. In general, striping involves segmenting received host data into logically sequential blocks (e.g. sequential blocks of an address space of a logical storage object), and then storing data written to consecutive blocks in the logical sequence of blocks onto different drives. A series of consecutive logically sequential data blocks that are stored across different drives is referred to as a RAID "stripe". By spreading data segments across multiple drives that can be accessed concurrently, total data throughput can be increased.

Some RAID levels employ a "parity" error protection scheme to provide fault tolerance. When parity protection is used, one or more additional parity blocks are maintained in each stripe. For example, a parity block for a stripe may be maintained that is the result of performing a bitwise exclusive "OR" (XOR) operation across the data blocks of the stripe. When the storage for a data block in the stripe fails, e.g. due to a drive failure, the lost data block can be recovered by performing an XOR operation across the remaining data blocks and the parity block.

One example of a RAID configuration that uses block level striping with distributed parity error protection is 4D+1P ("four data plus one parity") RAID-5. In 4D+1P RAID-5, each stripe consists of 4 data blocks and a block of parity information. In a traditional 4D+1P RAID-5 disk group, at least five storage disks are used to store the data and parity information, so that each one of the four data blocks and the parity information for each stripe can be stored on a different disk. A spare disk is also kept available to handle disk failures. In the event that one of the disks fails, the data stored on the failed disk can be rebuilt onto the spare disk by performing XOR operations on the remaining data blocks and the parity information on a per-stripe basis. 4D+1P RAID-5 is generally considered to be effective in preventing data loss in the case of single disk failures. However, data may be lost when two or more disks fail concurrently.

Other RAID configurations may provide data protection even in the event that multiple disks fail concurrently. For example, 4D+2P RAID-6 provides striping with double distributed parity information that is provided on a per-stripe basis. The double parity information maintained by 4D+2P RAID-6 enables data protection for up to a maximum of two concurrently failing drives.

Some data storage systems use "hybrid" arrays of non-volatile data storage drives, in which different individual ones of the non-volatile data storage drives have different data storage capacities. When traditional RAID technology has been applied using hybrid arrays of non-volatile data storage drives, some portions of one or more of the non-volatile data storage drives have often been left unused. As a result, a significant amount of the total storage drive capacity in the hybrid array may be wasted.

SUMMARY

Mapped RAID technology has been developed to provide multiple improvements over data storage systems that use traditional RAID technology. In particular, data storage systems using traditional RAID have exhibited significant limitations with regard to the ability to add new disks, and with regard to the amount of time required to rebuild data onto a replacement disk in the event of a disk failure. For example, traditional RAID systems have not supported the addition of new disks on an individual disk basis, but have instead required that new storage capacity be added only in increments equal to the number of disks that is required to support the specific RAID configuration, i.e. equal to the width of the RAID stripe being used. Accordingly, for 4D+1P RAID-5 configurations, new disks could only be added to a traditional RAID system in increments of five disks at a time. For 4D+2P RAID-6 configurations, new disks could only be added to traditional RAID systems in increments of six disks. As the capacity of individual disks has increased over time with the introduction of new storage technologies, the inflexibility of traditional RAID systems with regard to adding new capacity has become increasingly burdensome and impractical.

In another example, as individual disk capacity has increased, the time required by traditional RAID systems to rebuild data of an entire failed disk onto a single spare disk has also increased, and the write bandwidth of the single spare disk has become a significant performance bottleneck with regard to total rebuild time. Moreover, while data previously stored on the failed disk is being rebuilt on the spare disk, concurrent failure of one or more additional disks in a traditional RAID system during the rebuilding process may introduce the risk of data loss.

Mapped RAID technology improves on traditional RAID technology by allowing for the addition of individual non-volatile data storage drives to a data storage system in order to increase storage capacity, and also addresses the problem of increased rebuild times in traditional RAID caused by write bandwidth bottlenecks in dedicated spare disks. In mapped RAID technology, data storage drives are divided into contiguous regions of non-volatile data storage referred to as "drive extents" that are allocated from a drive extent pool. A RAID mapping table organizes the allocated drive extents into "RAID extents" that indicate the allocated drive extents. Each RAID extent indicates a unique set of drive extents allocated from the drive extent pool, and each drive extent allocated to a given RAID extent must be located on a different data storage drive. The drive extents indicated by a RAID extent are used to store the blocks of data and parity information for a stripe of data storage represented by the RAID extent. Accordingly, the total number of drive extents indicated by each RAID extent may be the same as the number of disks used in a traditional RAID system to store data blocks and parity information for the same RAID level. For example, in a mapped RAID system supporting a 4D+1P RAID-5 configuration, each RAID extent indicates a total of five drive extents that are used to store the four blocks of data as well as the parity information block of the stripe represented by the RAID extent. In a 4D+2P RAID-6 mapped RAID configuration, two parity information blocks are indicated by each RAID extent to provide an increased level of fault tolerance, and each RAID extent indicates a total of six drive extents.

In the event that a drive fails in a mapped RAID system, spare drive extents can be allocated that are located on multiple data storage drives that contribute to the drive extent pool in order to replace the drive extents from the failed drive, thus spreading the rebuild read and write operations across multiple data storage drives, and eliminating the write bandwidth bottleneck previously caused by traditional RAID's reliance on rebuilding to a single spare disk. In this way, mapped RAID can generally reduce rebuild time in the face of a single drive failure. Moreover, as the number of data storage drives increases, the amount of concurrent processing that can be used during the rebuild process may also increase, generally resulting in progressively improving rebuild performance for increasing numbers of data storage drives that contribute to the drive extent pool.

While increasing the number of data storage drives that contribute to the drive extent pool can increase rebuild performance due to the increased ability to spread the rebuild process across larger numbers of data storage drives, it must also be recognized that each data storage drive has its own independent probability of failure at any specific time. Accordingly, the probability of one or more additional drives failing at any point in time during the rebuild process also increases as more drives are added. When the total number of data storage drives reaches a sufficiently large number, the level of concurrent processing available during the rebuild process is no longer limited by the number of physical drives, and instead becomes limited by the availability and/or performance of one or more resources in the data storage system other than the physical drives, e.g. the availability and/or performance of the storage system CPUs, the availability and/or performance of the storage system memory, etc. After the number of physical drives contributing to the drive extent pool reaches such a maximum effective number, simply allowing more physical drives to be added still continues to increase the probability of one or more additional drives failing during the rebuild process, without providing further improvement in rebuild time performance. In view of this increased probability, in order to limit the risk of data loss occurring during drive rebuilds in the event of a drive failure, the disclosed mapped RAID system organizes the data storage drives that are contained in the storage array of a data storage system into limited size "partnership groups". Each data storage drive in the storage array is contained in only one of the partnership groups, and each partnership group contains a number of data storage drives that is not greater than a maximum drive group size. RAID extents in the RAID mapping table are organized into distinct RAID extent groups, and each one of the RAID extent groups corresponds to one of the partnership groups. Each RAID extent must only indicate drive extents allocated from the data storage drives that are contained in the partnership group corresponding to the RAID extent group that contains that RAID extent.

While mapped RAID technology may generally improve over traditional RAID in terms of utilization of drive capacity in hybrid arrays, in some cases, due to the requirement that each drive extent within a RAID extent be allocated from a different data storage drive, the effective data storage capacity of individual data storage drives in a hybrid partnership group may be significantly less than their total capacity. When the effective capacity of a data storage drive is less than its total capacity, the difference between the effective capacity of the drive and the total capacity of the drive is wasted capacity.

In order to reduce the amount of data storage capacity that may be wasted in a hybrid array of a data storage system, the disclosed technology includes techniques for assigning data storage drives from a set of newly added data storage drives to an original storage drive partnership group and a new storage drive partnership group. In the disclosed technology, RAID data protection is provided for a storage object in a data storage system. The data storage system includes a storage processor and an array of data storage drives that are communicably coupled to the storage processor, and the array of data storage drives includes an original partnership group of data storage drives. A RAID mapping table is generated that contains multiple RAID extents. Each RAID extent contained in the RAID mapping table indicates a fixed predetermined total number of drive extents that each persistently store host data written to the storage object. Each drive extent consists of a contiguous region of non-volatile data storage located on one of the data storage drives in the array. The RAID mapping table contains an original RAID extent group corresponding to the original partnership group. The original RAID extent group contains multiple RAID extents, and all RAID extents contained in the original RAID extent group only indicate drive extents that are located on data storage drives that are contained in the original partnership group.

The data storage system detects the addition of a set of new data storage drives to the array of data storage drives, and determines a total number of the highest capacity data storage drives contained in the original partnership group. The total number of highest capacity data storage drives contained in the original partnership group is compared to the minimum number of data storage drives required to provide RAID data protection for the storage object. In response to the total number of highest capacity data storage drives in the original partnership group being at least as large as the minimum number of data storage drives required to provide RAID data protection for the storage object, i) data storage drives are added to the original partnership group from the set of new data storage drives in ascending order of capacity until a total number of data storage drives in the original partnership group is equal to a maximum partnership group size, ii) a new partnership group is created that is made up of those data storage drives in the set of new data storage drives that were not added to the original partnership group, and iii) a new RAID extent group corresponding to the new partnership group is created in the RAID mapping table, such that all RAID extents contained in the new RAID extent group only indicate drive extents that are located on data storage drives that are contained in the new partnership group.

In some embodiments, in response to the total number of highest capacity data storage drives in the original partnership group being less than the minimum number of data storage drives required to provide RAID data protection for the storage object, in the case where the highest capacity data storage drives in the original partnership group and the highest capacity data storage drives in the set of new data storage drives each have the same capacity, a total number of highest capacity data storage drives in the set of new data storage drives is determined, and a sum of the total number of highest capacity data storage drives in the original partnership group and the total number of highest capacity data storage drives in the set of new data storage drives is compared to double the minimum number of data storage drives required to provide RAID data protection for the storage object. A determination is also made as to whether a number of new data storage drives can be added to the original partnership group that is equal to the difference between the total number of highest capacity data storage drives in the original partnership group and the minimum number of data storage drives required to provide RAID data protection for the storage object without a total number of data storage drives in the original partnership group exceeding a maximum partnership group size. In response to the sum of the total number of highest capacity data storage drives in the original partnership group and the total number of highest capacity data storage drives in the set of new data storage drives being at least as large as double the minimum number of data storage drives required to provide RAID data protection for the storage object, and to a determination that a number of new data storage drives can be added to the original partnership group that is equal to the difference between the total number of highest capacity data storage drives in the original partnership group and the minimum number of data storage drives required to provide RAID data protection for the storage object without the total number of data storage drives in the original partnership group exceeding the maximum partnership group size, i) highest capacity data storage drives are added to the original partnership group from the set of new data storage drives until the total number of highest capacity data storage drives in the original partnership group is equal to the minimum number of data storage drives required to provide RAID data protection for the storage object, ii) data storage drives are added to the original partnership group from the set of new data storage drives in ascending order of capacity until a total number of data storage drives in the original partnership group is equal to a maximum partnership group size, iii) a new partnership group is created that is made up of those data storage drives in the set of new data storage drives that were not added to the original partnership group, and iv) a new RAID extent group corresponding to the new partnership group is created in the RAID mapping table, such that all RAID extents contained in the new RAID extent group only indicate drive extents that are located on data storage drives that are contained in the new partnership group.

In some embodiments, in response to the total number of highest capacity data storage drives in the original partnership group being less than the minimum number of data storage drives required to provide RAID data protection for the storage object and, in the case where the highest capacity data storage drives in the original partnership group and the highest capacity data storage drives in the set of new data storage drives each have the same capacity, in response to the sum of the total number of highest capacity data storage drives in the original partnership group and the total number of highest capacity data storage drives in the set of new data storage drives being less than double the minimum number of data storage drives required to provide RAID data protection for the storage object, a sum of the total number of highest capacity data storage drives in the original partnership group and the total number of highest capacity data storage drives in the set of new data storage drives is compared to the minimum number of data storage drives required to provide RAID data protection for the storage object. A determination is also made as to whether a number of new data storage drives can be added to the original partnership group that is equal to the difference between the total number of highest capacity data storage drives in the original partnership group and the minimum number of data storage drives required to provide RAID data protection for the storage object without a total number of data storage drives in the original partnership group exceeding a maximum partnership group size. In response to the sum of the total number of highest capacity data storage drives in the original partnership group and the total number of highest capacity data storage drives in the set of new data storage drives being at least as large as the minimum number of data storage drives required to provide RAID data protection for the storage object, and to a determination that a number of new data storage drives can be added to the original partnership group that is equal to the difference between the total number of highest capacity data storage drives in the original partnership group and the minimum number of data storage drives required to provide RAID data protection for the storage object without the total number of data storage drives in the original partnership group exceeding the maximum partnership group size, i) data storage drives are added to the original partnership group from the set of new data storage drives in descending order of capacity until a total number of data storage drives in the original partnership group is equal to a maximum partnership group size, ii) a new partnership group is created that is made up of those data storage drives in the set of new data storage drives that were not added to the original partnership group, iii) a new RAID extent group corresponding to the new partnership group is created in the RAID mapping table, such that all RAID extents contained in the new RAID extent group only indicate drive extents that are located on data storage drives that are contained in the new partnership group.

In some embodiments, in response to the total number of highest capacity data storage drives in the original partnership group being less than the minimum number of data storage drives required to provide RAID data protection for the storage object and, in the case where the highest capacity data storage drives in the original partnership group and the highest capacity data storage drives in the set of new data storage drives each have the same capacity, in response to the sum of the total number of highest capacity data storage drives in the original partnership group and the total number of highest capacity data storage drives in the set of new data storage drives being less than the minimum number of data storage drives required to provide RAID data protection for the storage object, or in response to a determination that a number of new data storage drives cannot be added to the original partnership group that is equal to the difference between the total number of highest capacity data storage drives in the original partnership group and the minimum number of data storage drives required to provide RAID data protection for the storage object without the total number of data storage drives in the original partnership group exceeding the maximum partnership group size, i) data storage drives are added to the original partnership group from the set of new data storage drives in ascending order of capacity until a total number of data storage drives in the original partnership group is equal to a maximum partnership group size, ii) a new partnership group is created that is made up of those data storage drives in the set of new data storage drives that were not added to the original partnership group, and iii) a new RAID extent group corresponding to the new partnership group is created in the RAID mapping table, such that all RAID extents contained in the new RAID extent group only indicate drive extents that are located on data storage drives that are contained in the new partnership group.

In some embodiments, the minimum number of data storage drives required to provide RAID data protection for the storage object is greater than the total number of drive extents indicated by each RAID extent in the RAID mapping table. In other embodiments, the minimum number of data storage drives required to provide RAID data protection for the storage object is equal to the total number of drive extents indicated by each RAID extent in the RAID mapping table.

In some embodiments, the maximum drive group size may have a value that is at least twice as large as the minimum number of data storage drives required to provide RAID data protection for the storage object.

In some embodiments, multiple unallocated drive extents located on the data storage drives contained in the original partnership group are available as free drive extents to be allocated, in response to detecting a failure of one of the data storage drives contained in the original partnership group, to one or more RAID extents in the original RAID extent group, to replace drive extents located on the failed data storage drive contained in the original partnership group. Multiple unallocated drive extents located on the data storage drives contained in the new partnership group are available as free drive extents to be allocated, in response to detecting a failure of a data storage drive contained in the new partnership group, to one or more RAID extents in the new RAID extent group, to replace drive extents located on the failed data storage drive contained in the new partnership group.

Embodiments of the disclosed technology may provide significant advantages over previous technical solutions. Specifically, embodiments of the disclosed technology may provide for improved utilization of storage capacity in data storage drives contained in a hybrid array of a data storage system that uses mapped RAID. The effective data storage capacity of individual data storage drives may be increased, and consequently the amount of wasted data storage capacity in the array may be reduced.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 10 is a block diagram illustrating an example of the wasted capacity in an original partnership group of data storage drives to which drives may be added from a set of new data storage drives;

FIG. 11 is a block diagram illustrating an example of the effective capacity of the original partnership group of data storage drives in FIG. 10 and a new partnership group of data storage drives after assignment of the data storage drives in the set of new data storage drive shown in FIG. 10.

DETAILED DESCRIPTION

Embodiments of the invention will now be described. It should be understood that the embodiments described below are provided only as examples, in order to illustrate various features and principles of the invention, and that the invention is broader than the specific embodiments described below.

Figure 1:
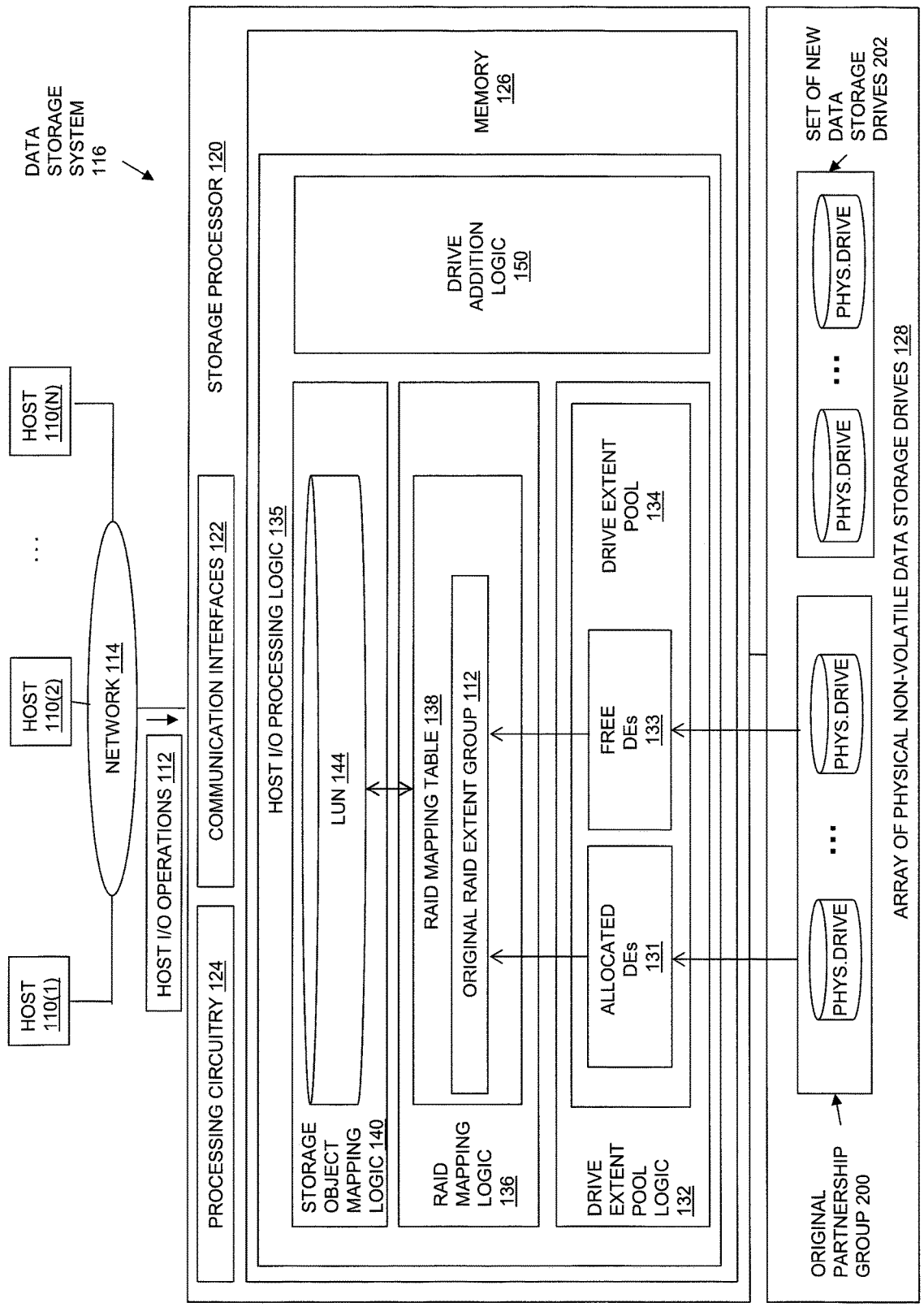
FIG. 1 is a block diagram showing a first view of an operational environment for the disclosed technology, including an example of a data storage system in which the disclosed technology may be embodied, with an original partnership group of data storage drives and a set of new data storage drives.

FIG. 1 is a block diagram showing an example of an operational environment for the disclosed technology, including an example of a data storage system in which the disclosed technology may be embodied. The data storage environment of FIG. 1 includes some number of Host Computing Devices 110, referred to as "hosts" and shown for purposes of illustration by Hosts 110(1) through 110(N), that access data storage provided by Data Storage System 116, for example over one or more computer networks, such as a local area network (LAN), and/or a wide area network (WAN) such as the Internet, etc., shown for purposes of illustration in FIG. 1 by Network 114. Data Storage System 116 includes at least one Storage Processor 120 and an Array of Physical Non-Volatile Data Storage Drives 128. Storage Processor 120 may, for example, be provided as a circuit board assembly, or "blade," which plugs into a chassis that encloses and cools multiple storage processors, and that has a backplane for interconnecting storage processors. However, no particular hardware configuration is required, and Storage Processor 120 may be embodied as any specific type of computing device capable of processing host input/output (I/O) operations received from Hosts 110 (e.g. I/O read and I/O write operations, create storage object operations, delete storage object operations, etc.).

The Array of Physical Non-Volatile Data Storage Drives 128 may include data storage drives such as magnetic disk drives, solid state drives, hybrid drives, and/or optical drives. Array of Physical Non-Volatile Data Storage Drives 128 may be directly physically connected to and/or contained within Storage Processor 120, and/or may be communicably connected to Storage Processor 120 by way of one or more computer networks, e.g. including or consisting of a Storage Area Network (SAN) or the like.

A Memory 126 in Storage Processor 120 stores program code that is executable on Processing Circuitry 124. Memory 126 may include volatile memory (e.g. RAM), and/or other types of memory. The Processing Circuitry 124 may, for example, include or consist of one or more microprocessors, e.g. central processing units (CPUs), multi-core processors, chips, and/or assemblies, and associated circuitry. Processing Circuitry 124 and Memory 126 together form control circuitry, which is configured and arranged to carry out various methods and functions as described herein. The Memory 126 stores a variety of software components that may be provided in the form of executable program code. For example, as shown in FIG. 1, Memory 126 may include software components such as Host I/O Processing Logic 135. When the program code is executed by Processing Circuitry 124, Processing Circuitry 124 is caused to carry out the operations of the software components. Although certain software components are shown and described for purposes of illustration and explanation, those skilled in the art will recognize that Memory 126 may include various other software components, such as an operating system, various applications, processes, etc.

During operation, Drive Extent Pool Logic 132 generates Drive Extent Pool 134 by dividing each one of the data storage drives in the Array of Physical Non-Volatile Data Storage Drives 128 into multiple, equal size drive extents, each one of which consists of a physically contiguous range of non-volatile data storage located on a single drive. For example, Drive Extent Pool Logic 132 may divide each one of the data storage drives in the Array of Physical Non-Volatile Data Storage Devices 128 into a fixed number of equal size drive extents of physically contiguous non-volatile storage, and add an indication (e.g. a drive index, a drive extent index, etc.) of each one of the resulting drive extents to Drive Extent Pool 134. The size of the drive extents into which the physical drives in the Array of Physical Non-Volatile Data Storage Drives 128 are divided is the same for every data storage drive. Various specific fixed sizes of drive extents may be used in different embodiments. For example, in some embodiments each drive extent may have a size of 10 gigabytes. Larger or smaller drive extent sizes may be used in alternative embodiments.

Drive extents are allocated from Drive Extent Pool 134 to specific RAID extents contained in RAID Mapping Table 138, to be used to store host data that is directed to portions of an address space of the LUN 144 that correspond to individual ones of those RAID extents. For example, a drive extent may be allocated from Drive Extent Pool 134 to a specific RAID extent contained in RAID Mapping Table 138 in response to an allocation request (e.g. from RAID Group Mapping Logic 136 or Drive Addition Logic 150), and then be used to store host data that is directed to a portion of the logical address space of LUN 144 that is mapped by RAID Mapping Logic 136 to that specific RAID extent. Each RAID extent in the RAID Mapping Table 138 indicates the same number of drive extents, and drive extents are allocated to RAID extents in the RAID Mapping Table 138 such that no two drive extents indicated by any single RAID extent are located on the same data storage drive.

A drive extent may be released (i.e. deallocated) from a specific RAID extent back to Drive Extent Pool 134, and thereby made available for allocation to a different RAID extent, in response to a deallocation request or the like from RAID Group Mapping Logic 136, e.g. when the drive extent is no longer needed to store host data.

When a drive extent is allocated to a RAID extent, an indication of the drive extent may be stored in the RAID extent. For example, a drive extent allocated to a RAID extent may be indicated within that RAID extent using a pair of indexes "m|n", in which "m" indicates a drive index of the data storage drive on which the drive extent is located (e.g. a numeric drive number within Array of Physical Non-Volatile Storage Drives 128, a slot number within which the physical drive located, or a textual drive name, etc.), and "n" indicates an index of the drive extent within the data storage drive (e.g. a numeric drive extent number, a block offset, a sector number, etc.). For example, in embodiments in which data storage drives are indexed within Array of Physical Non-Volatile Data Storage Devices 128 starting with 0, and in which drive extents are indexed within the data storage drive that contains them starting with 0, a first drive extent of a first data storage drive within Array of Physical Non-Volatile Data Storage Drives 128 may be represented by "0|0", a second drive extent within the first data storage drive within Array of Physical Non-Volatile Data Storage Drives 128 may be represented by "0|1", and so on.

Host I/O Processing Logic 135 exposes one or more logical storage objects to Hosts 110 for reading and/or writing host data, so that Hosts 110 can issue Host I/O Operations 112 to specific storage objects, e.g. using names or other identifiers of the storage objects. The storage objects exposed to Host I/O Operations 112 may be written, read, created, and/or deleted by Hosts 110 through Host I/O Operations 112. The storage objects exposed to Hosts 110 may include or consist of logical disks sometimes referred to as "LUNs", such as LUN 144. The storage objects exposed to Hosts 110 may alternatively include or consist of a host file system, virtual volume, and/or some other type of storage object, which Host I/O Processing Logic 135 makes accessible to Hosts 110 for reading and/or writing host data.

Storage Object Mapping Logic 140 and/or RAID Mapping Logic 136 directs host data written to sets of consecutive blocks in a logical address space of LUN 144 to specific corresponding RAID extents in RAID Mapping Table 138, so that the host data written to a set of consecutive blocks in the logical address space of LUN 144 can be persistently stored by drive extents indicated by a corresponding RAID extent, and so that parity information can be calculated and stored in at least one of the drive extents indicated by the corresponding RAID extent, in order to support data recovery. For example, an address space of LUN 144 may be made up of a set of sequential, equal size logical blocks of address space. Each host write I/O operation may indicate a specific block to be written within the address space of the LUN 144, e.g. using a logical block number (e.g. a logical block address) or offset into LUN 144. In some embodiments, 4D+1P RAID-5 block level striping with distributed parity error protection may be used to protect LUN 144, with each RAID stripe consisting of four data blocks and a block of parity information, and each RAID stripe being represented by a single RAID extent and mapped to drive extents indicated by that RAID extent. In such embodiments, each RAID extent in the RAID Mapping Table 138 indicates a total of five drive extents. For each set of four consecutive blocks in the logical address space of LUN 144 that are mapped to a single RAID extent, host data may be striped across the drive extents indicated by that RAID extent by storing host data written to consecutive ones of the four consecutive blocks of the logical address space of LUN 144 into different ones of four of the drive extents indicated by that RAID extent. Parity information may be calculated and stored in a fifth drive extent indicated by the RAID extent, e.g. as an XOR of the host data stored in the other four drive extents indicated by the RAID extent. In this way, host data stored in any one of the four drive extents indicated by the RAID extent that store host data can be recovered in the event of a failure of a data storage drive containing one of the four drive extents indicated by the RAID extent that store host data, for example by performing one or more XOR operations on the data stored in the three surviving drive extents indicated by the RAID extent that store host data, in combination with the parity information stored in the fifth drive extent indicated by the RAID extent.

In other embodiments, the RAID extents in the RAID Mapping Table 138 may each indicate some other fixed number of drive extents. For example, in some embodiments configured to provide 4D+2P RAID-6 protection for LUN 144, each RAID extent in the RAID Mapping Table 138 may represent a single data stripe by indicating a total of six drive extents, where each of the six drive extents is located on a different data storage drive, and where four of the indicated drive extents are used to store host data written to LUN 144, and two of the indicated drive extents are used to store parity information.

The data storage drives that are contained in the Array of Physical Non-Volatile Data Storage Drives 128 are divided by RAID Mapping Logic 136 and/or Drive Extent Pool Logic 132 into limited size partnership groups, including the Original Partnership Group 200. Each one of the data storage drives in the Array of Physical Non-Volatile Data Storage Drives 128 is contained in one and only one of the partnership groups, and each partnership group contains a number of data storage drives that is not greater than a maximum drive group size. RAID extents in the RAID Mapping Table 138 are organized into multiple separate and distinct RAID extent groups, each one of which consists of a range of consecutively located RAID extents within the RAID Mapping Table 138. Each one of the RAID extent groups in the RAID Mapping Table 138 corresponds to exactly one of the partnership groups in the Array of Physical Non-Volatile Data Storage Drives 128. RAID Mapping Logic 136 and/or Drive Extent Pool Logic 132 allocate drive extents from Drive Extent Pool 134 to RAID extents in the RAID Mapping Table 138 such that each individual RAID extent only indicates drive extents that are located on the data storage drives that are contained in the partnership group that corresponds to the RAID extent group that contains the RAID extent. For example, drive extents are allocated to the RAID extents contained in the Original RAID Extent Group 112 only from data storage drives that are contained in the partnership group that corresponds to Original RAID Extent Group 112, e.g. Original Partnership Group 200. Each drive extent located on the data storage drives contained in Original Partnership Group 200 may accordingly be either i) one of Allocated Drive Extents 131 that are allocated to a RAID extent in the Original RAID Extent Group 112, or ii) one of Free Drive Extents 133 that are unallocated "spare" drive extents available for future allocation to RAID extents in the Original RAID Extent Group 112, e.g. in response to a failure condition, to replace, within RAID extents in the Original RAID Extent Group 112, drive extents located on a failed drive in the Original Partnership Group 200.

Original Partnership Group 200 may be a "hybrid" group of data storage drives, that includes a variety of data storage drives having different individual storage capacities. For example, Original Partnership Group 200 may include some number of data storage drives that each have a total capacity of three terabytes ("3 TB"), some number of data storage drives that each have a total capacity of two terabytes ("2 TB"), some number of data storage drives that each have a total capacity of one terabyte ("1 TB"), and some number of data storage drives that each have a total capacity of five hundred gigabytes ("500 GB"). As a result, different ones of the data storage drives in the Original Partnership Group 200 may be divided into different total numbers of equal size drive extents.

Further during operation, Drive Addition Logic 150 detects the addition of a set of new data storage drives to the Array of Physical Non-Volatile Data Storage Drives 128. For example, Drive Addition Logic 150 may detect that the data storage drives in the Set of New Data Storage Drives 202 have been physically connected to the Array of Physical Non-Volatile Data Storage Drives 128. Like the Original Partnership Group 200, the Set of New Data Storage Drives 202 may be a "hybrid" group of data storage drives, that includes a variety of data storage drives having different individual storage capacities. For example, the Set of New Data Storage Drives 202 may include some number of data storage drives that each have a total capacity of three terabytes ("3 TB"), some number of data storage drives that each have a total capacity of two terabytes ("2 TB"), some number of data storage drives that each have a total capacity of one terabyte ("1 TB"), and some number of data storage drives that each have a total capacity of five hundred gigabytes ("500 GB").

Figure 2:
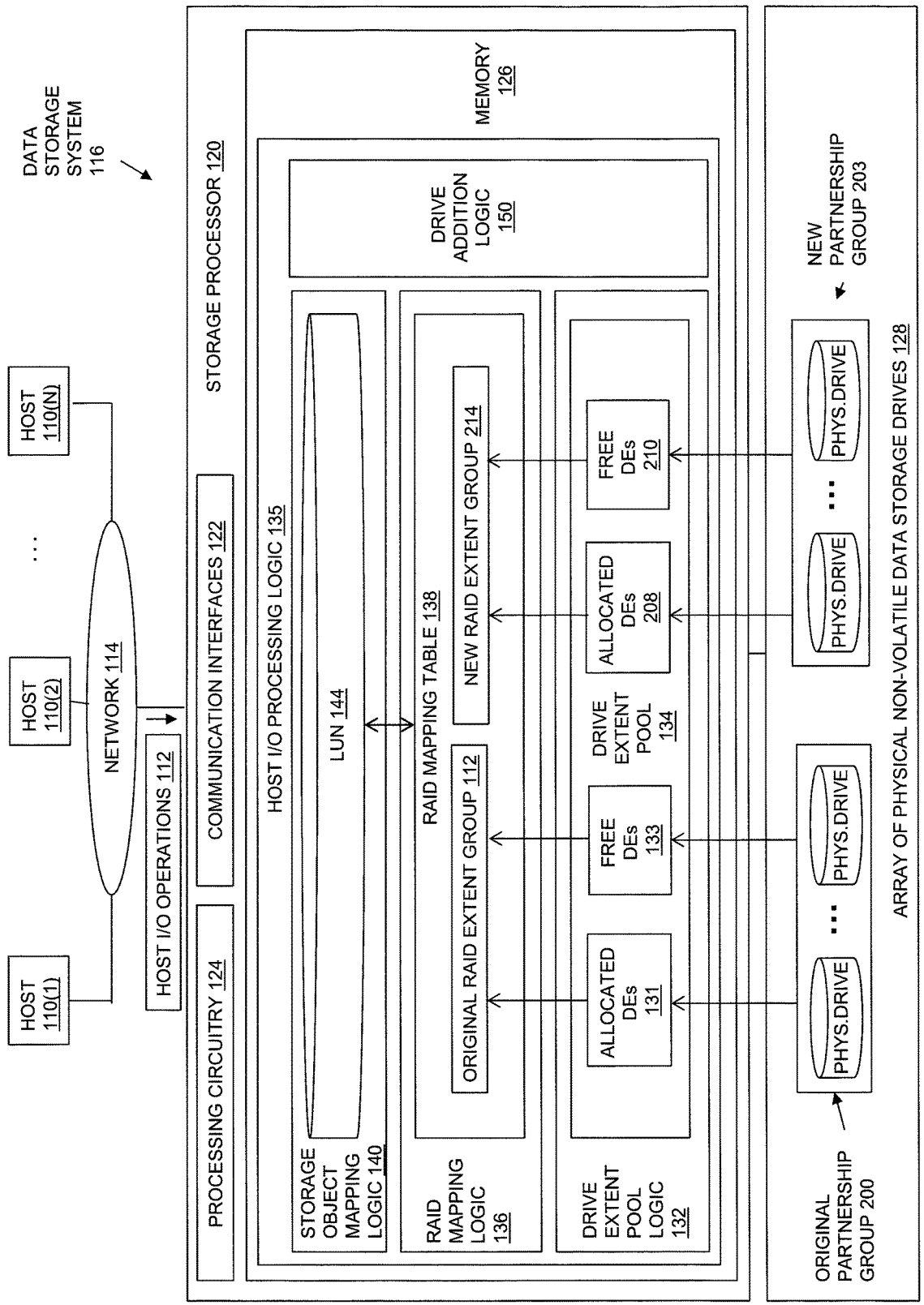
FIG. 2 is a block diagram showing the operational environment of FIG. 1 after the data storage drives have been assigned from the set of new data storage drives to the original partnership group of data storage drives and to a new partnership group of data storage drives.

In response to detecting the addition of the Set of New Data Storage Drives 202 to the Array of Physical Non-Volatile Data Storage Drives 128, Drive Addition Logic 150 operates to assign individual data storage drives from the Set of New Data Storage Drives 202 to either the Original Partnership Group 200, or to a newly created partnership group, as shown in FIG. 2 by New Partnership Group 203. Drive Addition Logic 150 determines a total number of the highest capacity data storage drives that are contained in the Original Partnership Group 200. For example, Drive Addition Logic 150 may poll each one of the data storage drives in Original Partnership Group 200 for a total capacity, and then count the number of data storage drives having the highest capacity in the Original Partnership Group 200, e.g.

the total number of data storage drives in the Original Partnership Group 200 that have a capacity of 3 TB. The Drive Addition Logic 150 may then compare the total number highest capacity data storage drives (e.g. the total number of 3 TB capacity data storage drives) that are contained in the Original Partnership Group 200 to a minimum number of data storage drives that are required to provide RAID data protection for the LUN 144. In response to detecting that the total number of highest capacity data storage drives contained in the Original Partnership Group 200 is at least as large as the minimum number of data storage drives required to provide RAID data protection for the LUN 144, the Drive Addition Logic 150 adds data storage drives to Original Partnership Group 200 from the Set of New Data Storage Drives 202 in ascending order of capacity, starting with the lowest capacity data storage drives in the Set of New Data Storage Drives 202, until the total number of data storage drives in the Original Partnership Group 200 is equal to a maximum partnership group size. For example, Drive Addition Logic 150 may start by adding the 500 GB capacity data storage drives one by one from the Set of New Data Storage Drives 202 to the Original Partnership Group 200, and continue if necessary by adding the 1 TB capacity data storage drives one by one from the Set of New Data Storage Drives 202 to the Original Partnership Group 200, and so on as needed through higher capacity data storage drives in the Set of New Data Storage Drives 202, only until the total number of data storage drives in the Original Partnership Group 200 is equal to a maximum partnership group size. Drive Addition Logic 150 may then create a new partnership group, shown by the New Partnership Group 203 in FIG. 2. New Partnership Group 203 is made up of those data storage drives in the Set of New Data Storage Drives 202 that were not added to the Original Partnership Group 200. Drive Addition Logic 150 also creates a new RAID extent group in the RAID Mapping Table 138 that corresponds to the New Partnership Group 203, as shown in FIG. 2 by New RAID Extent Group 214. As part of creating New Partnership Group 203, drive extents are allocated from data storage drives contained in the New Partnership Group 203 to New RAID Extent Group 214 such that all RAID extents contained in the New RAID Extent Group 214 only indicate drive extents that are located on data storage drives that are contained in the New Partnership Group 203. Specifically, as further shown in FIG. 2, each drive extent located on the data storage drives contained in the New Partnership Group 203 may accordingly be either i) one of Allocated Drive Extents 208 that are allocated to a RAID extent in the New RAID Extent Group 214, or ii) one of Free Drive Extents 210 that are unallocated "spare" drive extents available for future allocation to RAID extents in the New RAID Extent Group 214, e.g. in response to a failure condition, to replace, within RAID extents in New RAID Extent Group 214, drive extents located on a failed drive in the New Partnership Group 203.

In some embodiments, in response to detecting that the total number of highest capacity data storage drives in Original Partnership Group 200 is less than the minimum number of data storage drives required to provide RAID data protection for the LUN 144, in the case where the highest capacity data storage drives in Original Partnership Group 200 and the highest capacity data storage drives in the Set of New Data Storage Drives 202 each have the same capacity, Drive Addition Logic 150 determines a total number of highest capacity data storage drives in the Set of New Data Storage Drives 202, and compares a sum of the total number of highest capacity data storage drives in the Original Partnership Group 200 and the total number of highest capacity data storage drives in the Set of New Data Storage Drives 202 to double the minimum number of data storage drives required to provide RAID data protection for the LUN 144. For example, Drive Addition Logic 150 may compare the sum of the number of 3 TB capacity data storage drives in the Original Partnership Group 200 and the number of 3 TB capacity data storage drives in the Set of New Data Storage Drives 202 to double the minimum number of data storage drives required to provide RAID data protection for the LUN 144. A determination is also made as to whether a number of data storage drives from the Set of New Data Storage Drives 202 can be added to the Original Partnership Group 200 that is equal to the difference between the total number of highest capacity data storage drives in the Original Partnership Group 200 and the minimum number of data storage drives required to provide RAID data protection for the LUN 144 without the total number of data storage drives in the Original Partnership Group 200 exceeding the maximum partnership group size. In response to detecting that the sum of the total number of highest capacity data storage drives in the Original Partnership Group 200 and the total number of highest capacity data storage drives in the Set of New Data Storage Drives 202 is at least as large as double the minimum number of data storage drives required to provide RAID data protection for the LUN 144, and to a determination that a number of data storage drives from the Set of New Data Storage Drives 202 can be added to the Original Partnership Group 202 that is equal to the difference between the total number of highest capacity data storage drives in the Original Partnership Group 202 and the minimum number of data storage drives that is required to provide RAID data protection for the LUN 144 without the total number of data storage drives in the Original Partnership Group 200 exceeding the maximum partnership group size, Drive Addition Logic 150 adds highest capacity data storage drives (e.g. 3 TB capacity data storage drives) to the Original Partnership Group 200 from the Set of New Data Storage Drives 202 until the total number of highest capacity data storage drives in the Original Partnership Group 200 is equal to the minimum number of data storage drives required to provide RAID data protection for the LUN 144. Drive Addition Logic 150 then adds data storage drives to the Original Partnership Group 200 from the Set of New Data Storage Drives 202 in ascending order of capacity, starting with the lowest capacity data storage drives in the Set of New Data Storage Drives 202, until a total number of data storage drives in the Original Partnership Group 200 is equal to a maximum partnership group size. Drive Addition Logic 150 then creates a new partnership group that is made up of those data storage drives in the Set of New Data Storage Drives 202 that were not added to the Original Partnership Group 200, as shown by New Partnership Group 203 in FIG. 2, and creates a new RAID extent group corresponding to the New Partnership Group 203 in the RAID Mapping Table 138, as shown by New RAID Extent Group 214 in FIG. 2, such that all RAID extents contained in the New RAID Extent Group 214 only indicate drive extents that are located on data storage drives that are contained in the New Partnership Group 203.

In some embodiments, in response to detecting that the total number of highest capacity data storage drives in the Original Partnership Group 200 is less than the minimum number of data storage drives required to provide RAID data protection for the LUN 144, and, in the case where the highest capacity data storage drives in Original Partnership Group 200 and the highest capacity data storage drives in the Set of New Data Storage Drives 202 each have the same capacity, to detecting that the sum of the total number of highest capacity data storage drives in the Original Partnership Group 200 and the total number of highest capacity data storage drives in the Set of New Data Storage Drives 202 is less than double the minimum number of data storage drives required to provide RAID data protection for the LUN 144, a sum of the total number of highest capacity data storage drives in the Original Partnership Group 200 and the total number of highest capacity data storage drives in the Set of New Data Storage Drives 202 is compared to the minimum number of data storage drives required to provide RAID data protection for the LUN 144. A determination is also made as to whether a number of data storage drives from the Set of New Data Storage Drives 202 can be added to the Original Partnership Group 200 that is equal to the difference between the total number of highest capacity data storage drives in the Original Partnership Group 200 and the minimum number of data storage drives required to provide RAID data protection for the LUN 144 without the total number of data storage drives in the Original Partnership Group 200 exceeding the maximum partnership group size. In response to detecting that the sum of the total number of highest capacity data storage drives in the Original Partnership Group 200 and the total number of highest capacity data storage drives in the Set of New Data Storage Drives 202 is at least as large as the minimum number of data storage drives required to provide RAID data protection for the LUN 144, and to a determination that a number of data storage drives from the Set of New Data Storage Drives 202 can be added to the Original Partnership Group 202 that is equal to the difference between the total number of highest capacity data storage drives in the Original Partnership Group 202 and the minimum number of data storage drives that is required to provide RAID data protection for the LUN 144 without the total number of data storage drives in the Original Partnership Group 200 exceeding the maximum partnership group size, the Drive Addition Logic 150 adds data storage drives to the Original Partnership Group 200 from the Set of New Data Storage Drives 202 in descending order of capacity, starting with the highest capacity data storage drives in the Set of New Data Storage Drives 202, until a total number of data storage drives in the Original Partnership Group 200 is equal to the maximum partnership group size. Drive Addition Logic 150 then creates a new partnership group is created that is made up of those data storage drives in the Set of New Data Storage Drives 202 that were not added to the Original Partnership Group 200, as shown by New Partnership Group 203 in FIG. 2. Drive Addition Logic 150 then creates a new RAID extent group corresponding to the New Partnership Group 203 in the RAID Mapping Table 138, as shown by New RAID Extent Group 214 in FIG. 2, such that all RAID extents contained in the New RAID Extent Group 214 only indicate drive extents that are located on data storage drives that are contained in the New Partnership Group 203.

In some embodiments, in response to detecting that the total number of highest capacity data storage drives in the Original Partnership Group 200 is less than the minimum number of data storage drives required to provide RAID data protection for the LUN 144, and, in the case where the highest capacity data storage drives in Original Partnership Group 200 and the highest capacity data storage drives in the Set of New Data Storage Drives 202 each have the same capacity, to detecting that the sum of the total number of highest capacity data storage drives in the Original Partnership Group 200 and the total number of highest capacity data storage drives in the Set of New Data Storage Drives 202 is less than the minimum number of data storage drives that is required to provide RAID data protection for the LUN 144, or in response to a determination that a number of new data storage drives cannot be added to the original partnership group that is equal to the difference between the total number of highest capacity data storage drives in the original partnership group and the minimum number of data storage drives required to provide RAID data protection for the storage object without the total number of data storage drives in the original partnership group exceeding the maximum partnership group size, Drive Addition Logic 150 adds data storage drives to the Original Partnership Group 200 from the Set of New Data Storage Drives 202 in ascending order of capacity, starting with the lowest capacity data storage drives in the Set of New Data Storage Drives 202, until a total number of data storage drives in the Original Partnership Group is equal to a maximum partnership group size. The Drive Addition Logic 150 then creates a new partnership group that is made up of those data storage drives in the Set of New Data Storage Drives 202 that were not added to the Original Partnership Group 200, as shown by New Partnership Group 203 in FIG. 2. Drive Addition Logic 150 then creates a new RAID extent group corresponding to the New Partnership Group 203 in the RAID Mapping Table 138, as shown by New RAID Extent Group 214 in FIG. 2, such that all RAID extents contained in the New RAID Extent Group 214 only indicate drive extents that are located on data storage drives that are contained in the New Partnership Group 203.

In some embodiments, the minimum number of data storage drives that is required to provide RAID data protection for the LUN 144 may be greater than the total number of drive extents indicated by each RAID extent in the RAID Mapping Table 138, e.g. the minimum number of data storage drives that is required to provide RAID data protection for the LUN 144 may be equal to the fixed number of drive extents indicated by each RAID extent in the RAID Mapping Table 138 plus one. In some other embodiments, the minimum number of data storage drives required to provide RAID data protection for the storage object may be equal to the total number of drive extents indicated by each RAID extent in the RAID mapping table.

The maximum drive group size may be equal to a value that is at least twice as large as the minimum number of data storage drives required to provide RAID data protection for the LUN 144.

Figure 3:
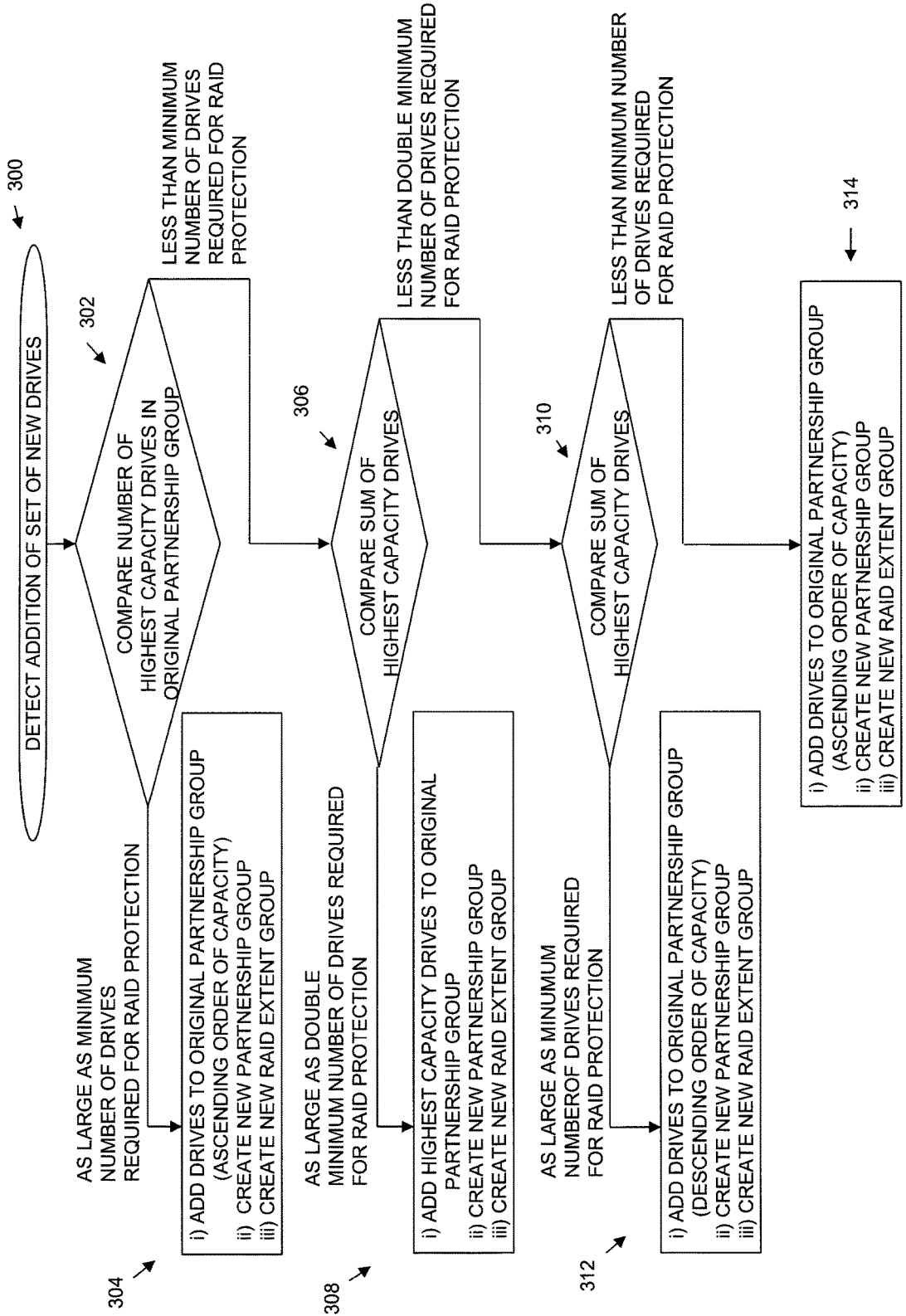
FIG. 3 is a flow chart showing an example of steps performed during operation of some embodiments to assign data storage drives from a set of new data storage drives to an original partnership group of data storage drives and to a new partnership group of data storage drives.

FIG. 3 is a flow chart showing an example of steps performed during operation of some embodiments to assign data storage drives from a set of new data storage drives to an original partnership group of data storage drives and to a new partnership group of data storage drives. The steps of FIG. 3 may, for example, be performed by the Host I/O Processing Logic 135, e.g. in whole or in part by the Drive Addition Logic 150 and/or other portions of the Host I/O Processing Logic 135.

At 300 the disclosed technology detects the addition of a set of new data storage drives to the array of physical non-volatile data storage drives that is communicably connected to the data storage system. At step 302, the number of highest capacity data storage drives in an original partnership group of data storage drives is compared to a minimum number of data storage drives that is required to provide RAID protection for a storage object. If the number of highest capacity drives in the original partnership group is less than the minimum number of data storage drives that is required to provide RAID protection for the storage object, step 302 is followed by step 306. Otherwise, step 302 is followed by step 304.

At step 304, individual data storage drives are added to the original partnership group from the set of new data storage drives in ascending order of capacity, starting with the lowest capacity data storage drives in the set of new data storage drives, until a total number of data storage drives in the original partnership group is equal to a maximum partnership group size. Further at step 304, a new partnership group is created that is made up of those data storage drives in the set of new data storage drives that were not added to the original partnership group, and a new RAID extent group corresponding to the new partnership group is created in the RAID mapping table, such that all RAID extents contained in the new RAID extent group only indicate drive extents that are located on data storage drives that are contained in the new partnership group.

At step 306, in the case where the highest capacity data storage drives in the original partnership group and the highest capacity data storage drives in the set of new data storage drives each have the same capacity, a sum of the total number of highest capacity data storage drives in the original partnership group and the total number of highest capacity data storage drives in the set of new data storage drives is compared to double the minimum number of data storage drives that is required to provide RAID protection for the storage object. If the sum of the total number of highest capacity data storage drives in the original partnership group and the total number of highest capacity data storage drives in the set of new data storage drives is less than double the minimum number of data storage drives that is required to provide RAID protection for the storage object, then step 306 is followed by step 310. Otherwise, step 306 is followed by step 308.

At step 308, highest capacity data storage drives are added to the original partnership group from the set of new data storage drives until the total number of highest capacity data storage drives in the original partnership group is equal to the minimum number of data storage drives that is required to provide RAID data protection for the storage object. Further at step 308, individual data storage drives may be added to the original partnership group from the set of new data storage drives in ascending order of capacity, starting with the lowest capacity data storage drives in the set of new data storage drives, until a total number of data storage drives in the original partnership group is equal to a maximum partnership group size. In addition, a new partnership group is created that is made up of those data storage drives in the set of new data storage drives that were not added to the original partnership group, and a new RAID extent group corresponding to the new partnership group is created in the RAID mapping table, such that all RAID extents contained in the new RAID extent group only indicate drive extents that are located on data storage drives that are contained in the new partnership group.

In step 310, in the case where the highest capacity data storage drives in the original partnership group and the highest capacity data storage drives in the set of new data storage drives each have the same capacity, a sum of the total number of highest capacity data storage drives in the original partnership group and the total number of highest capacity data storage drives in the set of new data storage drives is compared to the minimum number of data storage drives that is required to provide RAID protection for the storage object. If the sum of the total number of highest capacity data storage drives in the original partnership group and the total number of highest capacity data storage drives in the set of new data storage drives is less than the minimum number of data storage drives that is required to provide RAID protection for the storage object, then step 310 is followed by step 314. Otherwise, step 310 is followed by step 312.

At step 312, individual data storage drives are added to the original partnership group from the set of new data storage drives in descending order of capacity, starting with the highest capacity data storage drives in the set of new data storage drives, until a total number of data storage drives in the original partnership group is equal to a maximum partnership group size. Further at step 312, a new partnership group is created that is made up of those data storage drives in the set of new data storage drives that were not added to the original partnership group, and a new RAID extent group corresponding to the new partnership group is created in the RAID mapping table, such that all RAID extents contained in the new RAID extent group only indicate drive extents that are located on data storage drives that are contained in the new partnership group At step 314, individual data storage drives are added to the original partnership group from the set of new data storage drives in ascending order of capacity, starting with the lowest capacity data storage drives in the set of new data storage drives, until a total number of data storage drives in the original partnership group is equal to a maximum partnership group size. Further at step 314, a new partnership group is created that is made up of those data storage drives in the set of new data storage drives that were not added to the original partnership group, and a new RAID extent group corresponding to the new partnership group is created in the RAID mapping table, such that all RAID extents contained in the new RAID extent group only indicate drive extents that are located on data storage drives that are contained in the new partnership group.

In some embodiments, steps 308 and 312 include an additional preliminary determination as to whether a number of new data storage drives can be added to the original partnership group that is equal to a difference between the total number of highest capacity data storage drives in the original partnership group and the minimum number of data storage drives required to provide RAID data protection for the storage object without a total number of data storage drives in the original partnership group exceeding the maximum partnership group size. In such embodiments, neither step 308 nor step 312 is performed unless a number of new data storage drives can be added to the original partnership group that is equal to a difference between the total number of highest capacity data storage drives in the original partnership group and the minimum number of data storage drives required to provide RAID data protection for the storage object without the total number of data storage drives in the original partnership group exceeding the maximum partnership group size. Further in such embodiments, step 314 may be performed in response to a determination that a number of new data storage drives cannot be added to the original partnership group that is equal to a difference between the total number of highest capacity data storage drives in the original partnership group and the minimum number of data storage drives required to provide RAID data protection for the storage object without the total number of data storage drives in the original partnership group exceeding the maximum partnership group size.

Those skilled in the art will recognize that the specific steps shown in FIG. 3, and the order of the steps shown in FIG. 3, are given only for purposes of providing an illustrative example of operation of some embodiments of the technology disclosed herein. The disclosed technology is not limited to embodiments that use the specific steps shown in FIG. 3, or to the specific order of the steps shown in FIG. 3, and may alternatively be embodied or configured using other specific steps and/or step ordering.

Figure 4:
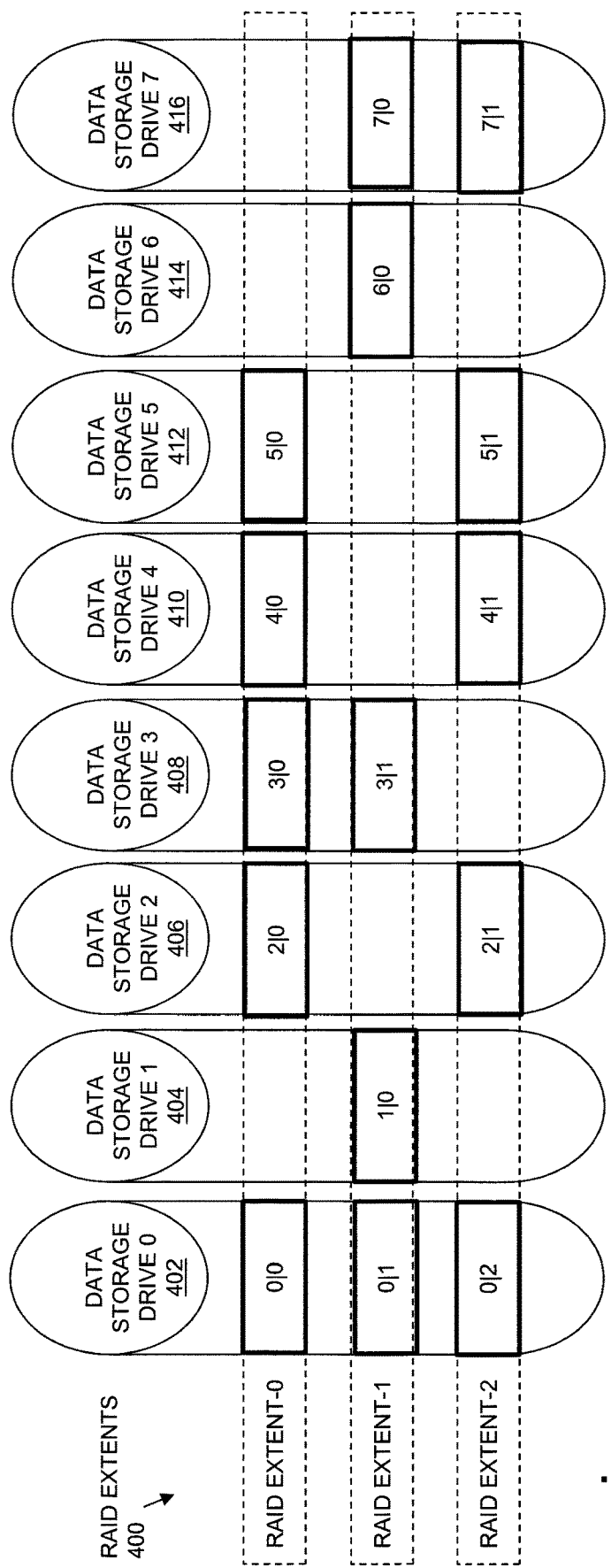
FIG. 4 is a block diagram showing an example of RAID extents in a RAID mapping table indicating drive extents that are located on data storage drives contained in a partnership group of data storage drives in some embodiments.

FIG. 4 is a block diagram showing an example of RAID extents in a RAID mapping table indicating drive extents that are located on data storage drives contained in a partnership group of data storage drives. For example, RAID Extents 400 may be contained in a RAID mapping table in embodiments that provide 4D+1P RAID-5 striping and data protection. As shown in the example of FIG. 4, RAID Extents 400 include a first RAID Extent-0, a second RAID Extent-1, a third RAID Extent-2, and so on for some total number of RAID extents in the RAID mapping table. In order to provide 4D+1P RAID-5, each RAID extent in RAID Extents 400 indicates a total of five drive extents.

RAID Extent-0 is shown for purposes of illustration indicating a first drive extent 0|0, which is the first drive extent in Data Storage Drive 0 402, a second drive extent 2|0, which is the first drive extent in Data Storage Drive 2 406, a third drive extent 3|0, which is the first drive extent in Data Storage Drive 3 408, a fourth drive extent 4|0, which is the first drive extent in Data Storage Drive 4 410, and a fifth drive extent 5|0, which is the first drive extent in Data Storage Drive 5 412.

RAID Extent-1 is shown for purposes of illustration indicating a first drive extent 0|1, which is the second drive extent in Data Storage Drive 0 402, a second drive extent 1|0, which is the first drive extent in Data Storage Drive 1 404, a third drive extent 3|1, which is the second drive extent in Data Storage Drive 3 408, a fourth drive extent 6|0, which is the first drive extent in Data Storage Drive 6 414, and a fifth drive extent 7|0, which is the first drive extent in Data Storage Drive 7 416.

RAID Extent-2 is shown for purposes of illustration indicating a first drive extent 0|2, which is the third drive extent in Data Storage Drive 0 402, a second drive extent 2|1, which is the second drive extent in Data Storage Drive 2 406, a third drive extent 4|1, which is the second drive extent in Data Storage Drive 4 410, a fourth drive extent 5|1, which is the second drive extent in Data Storage Drive 5 412, and a fifth drive extent 7|1, which is the second drive extent in Data Storage Drive 7 416.

Figure 5:
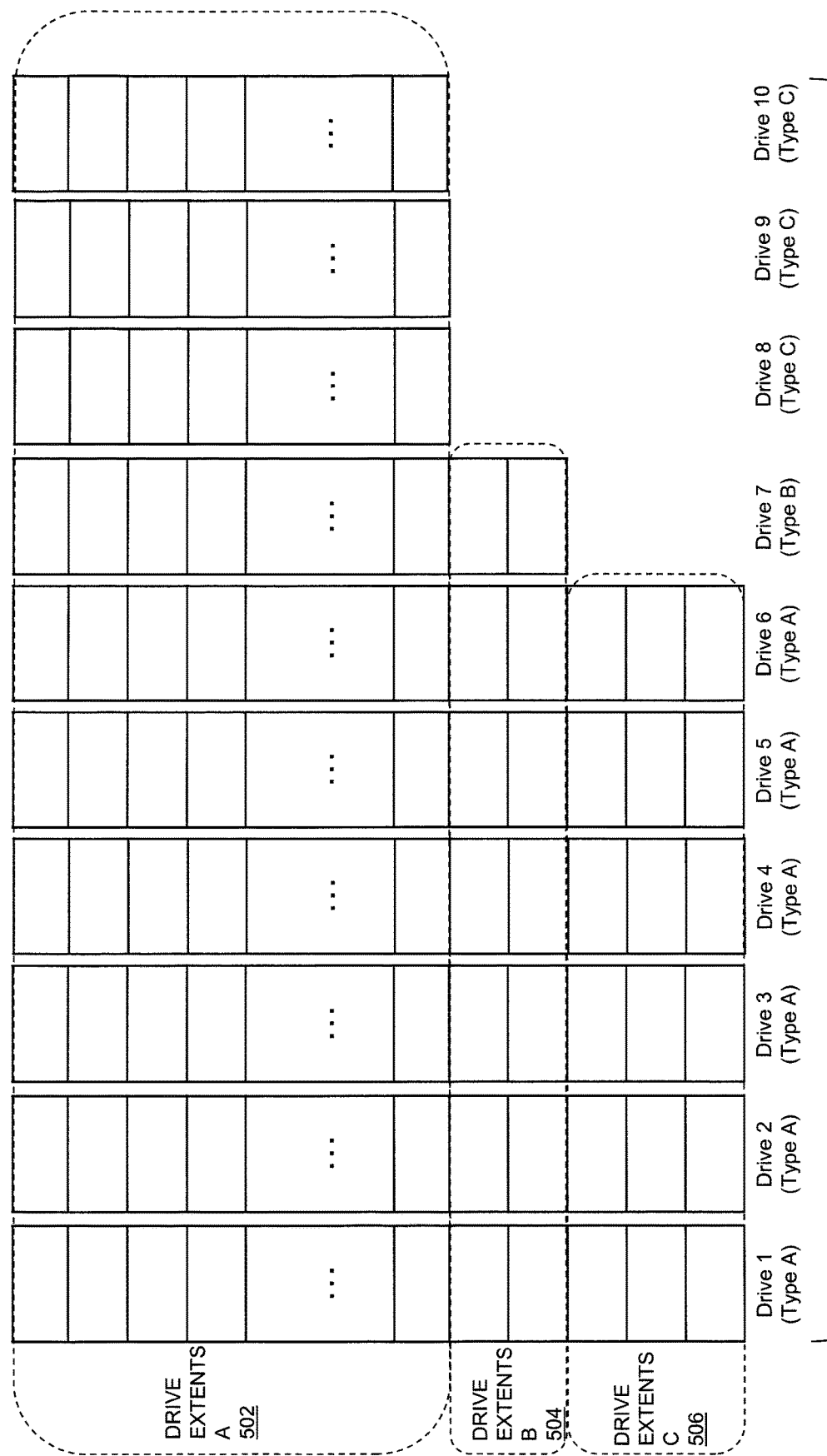
FIG. 5 is a block diagram showing an example of a partnership group of data storage drives having a total number of highest capacity data storage drives that is at least as large as a minimum number of data storage drives that is required to provide RAID data protection for a storage object.

FIG. 5 is a block diagram showing an example of a Partnership Group 500 of data storage drives having a total number of highest capacity data storage drives that is at least as large as a minimum number of data storage drives that is required to provide RAID data protection for a storage object. In the example of FIG. 5, the Partnership Group 500 contains ten data storage drives, labeled Drive 1 through Drive 10. Drive 1, Drive 2, Drive 3, Drive 4, Drive 5 and Drive 6 are each Type A drives, and have the highest capacity of the data storage drives in Partnership Group 500, e.g. 3 TB. Drive 7 is a Type B drive, having the next highest capacity of the data storage drives in Partnership Group 500, e.g. 2 TB. Drive 8, Drive 9 and Drive 10 are Type C data storage drives, and have the lowest capacity of the data storage drives in Partnership Group 600, e.g. 1 TB. In the example of FIG. 5, the minimum number of data storage drives that is required to provide RAID protection for the storage object is six, as would be the case in an embodiment in which 4D+1P RAID-5 data protection is provided, and in which the minimum number of data storage drives that is required to provide RAID protection for the storage object is one more than the number of drive extents indicated by each RAID extent in the RAID mapping table. As shown in FIG. 5, the total number of largest capacity data storage drives in Partnership Group 500 is also six, and accordingly is at least as large as the minimum number of data storage drives that is required to provide RAID protection for the storage object. Because the total number of largest capacity data storage drives in Partnership Group 500 is at least as large as the minimum number of data storage drives that is required to provide RAID protection for the storage object, there is no wasted capacity in the data storage drives contained in Partnership Group 500, since drive extents can be allocated to individual RAID extents from logical sets of drive extents that each span a total number of data storage drives that is at least as large as the minimum number of data storage drives that is required to provide RAID protection for the storage object, and that together include all the drive extents of all the data storage drives in Partnership Group 500, as shown by Drive Extents A 502, Drive Extents B 504, and Drive Extents C 506. Each one of Drive Extents A 502, Drive Extents B 504, and Drive Extents C 506 spans at least six data storage drives. Accordingly, when allocating drive extents to RAID extents that each indicate five drive extents, with the requirement that no two drive extents indicated by a single RAID extent can be allocated from the same data storage drive, each individual RAID extent can be allocated drive extents exclusively from either Drive Extents A 502, Drive Extents B 504, or Drive Extents C 506, without wasting any capacity in the data storage drives of Partnership Group 500. Because there is no wasted capacity in any of the data storage drives of Partnership Group 500, the effective capacity of each one of the data storage drives in Partnership Group 500 is same as each data storage drive's total capacity.

Figure 6:
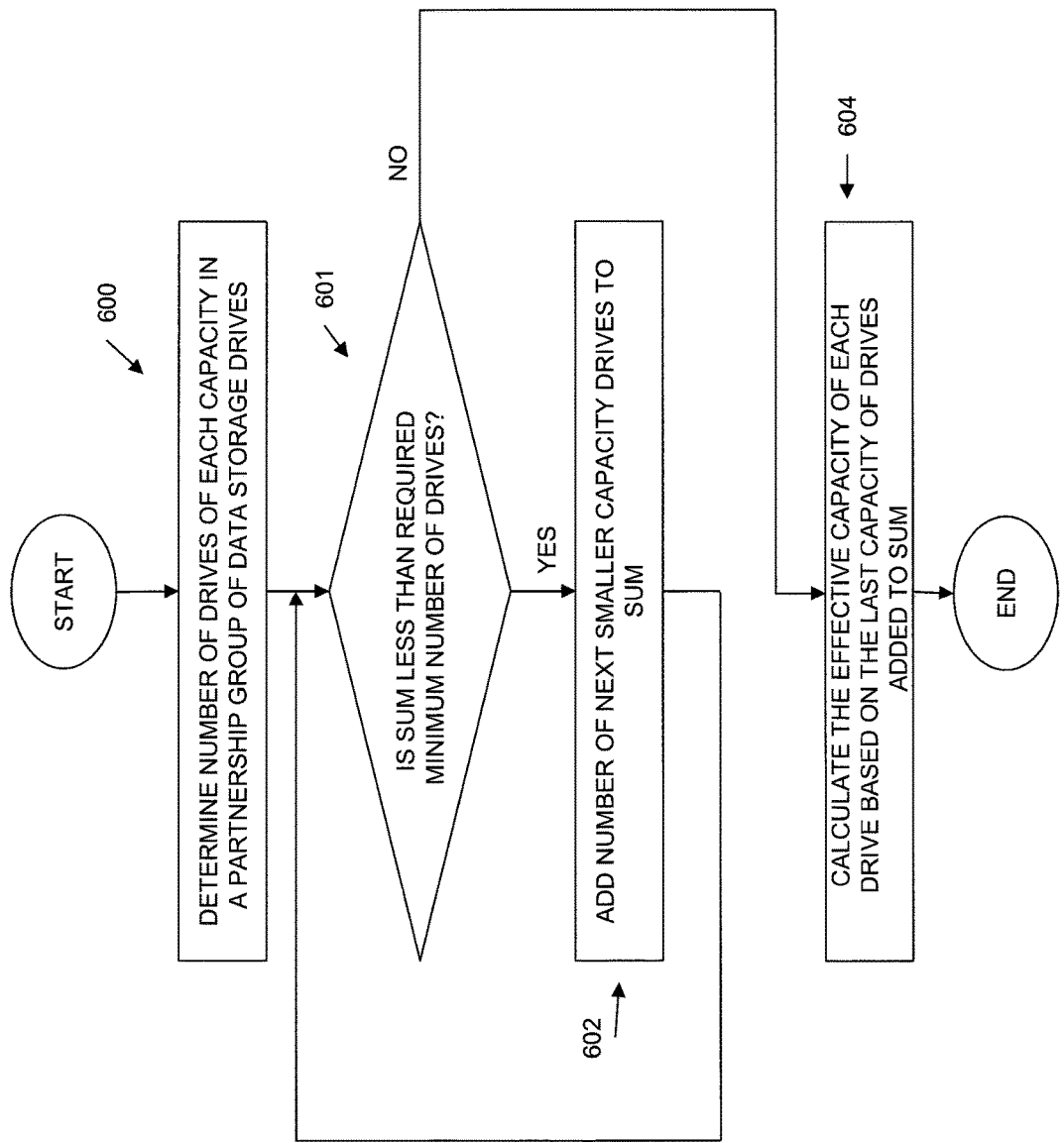
FIG. 6 is a flow chart illustrating steps in a process for determining an effective capacity of the data storage drives in a hybrid partnership group of data storage drives.

FIG. 6 is a flow chart illustrating steps in a process for determining an effective capacity of the data storage drives in a hybrid partnership group of data storage drives. The steps of FIG. 6 illustrate the advantageousness of providing a number of highest capacity data storage drives in a partnership group that is at least as large the minimum number of data storage drives that is required to provide RAID protection for a storage object, in order to eliminate wasted capacity.

At step 600, the number of data storage drives having each different storage capacity in the partnership group is determined. For example, the number of highest capacity data storage drives is counted, the number of the next highest capacity data storage drives is counted, and so on for all the different capacity data storage drives in the partnership ship group. Further at step 600, as an initial step, the value of a SUM variable is initially set to the total number of the highest capacity data storage drives in the partnership group.

At step 601, the value of SUM is compared to the minimum number of data storage drives that is required to provide RAID protection for the storage object. If the value of SUM is not less than the minimum number of data storage drives that is required to provide RAID protection for the storage object, then step 601 is followed by step 604. Otherwise, step 601 is followed by step 602.

At step 602 the number of data storage drives in the partnership group that have a next lower capacity than the capacity of the last data storage drives that were added to SUM is added to SUM. Step 602 is followed by step 601. Thus step 602 is repeated to add the total number of progressively smaller capacity data storage drives to SUM until SUM is at least as large as the minimum number of data storage drives that are required to provide RAID protection for the storage object, at which point step 604 calculates the effective capacity for each data storage drive in the partnership group.

At step 604, the effective capacity for each data storage drive in the partnership group is calculated as the minimum of i) the total capacity for the data storage drive, and ii) the last capacity of data storage drives that were added to SUM. For example, if SUM only became as large as the minimum number of data storage drives that are required to provide RAID protection for the storage object after the total number of 1 TB capacity data storage drives in the partnership was added to SUM, then the effective capacity for each data storage drive in the partnership group is calculated as the minimum of i) the total capacity for the data storage drive, and ii) 1 TB. Accordingly, the effective capacity of any data storage drive larger than 1 TB would be limited to 1 TB, and any capacity over 1 TB in any one of the data storage drives of the partnership group would be wasted.

Figure 7:
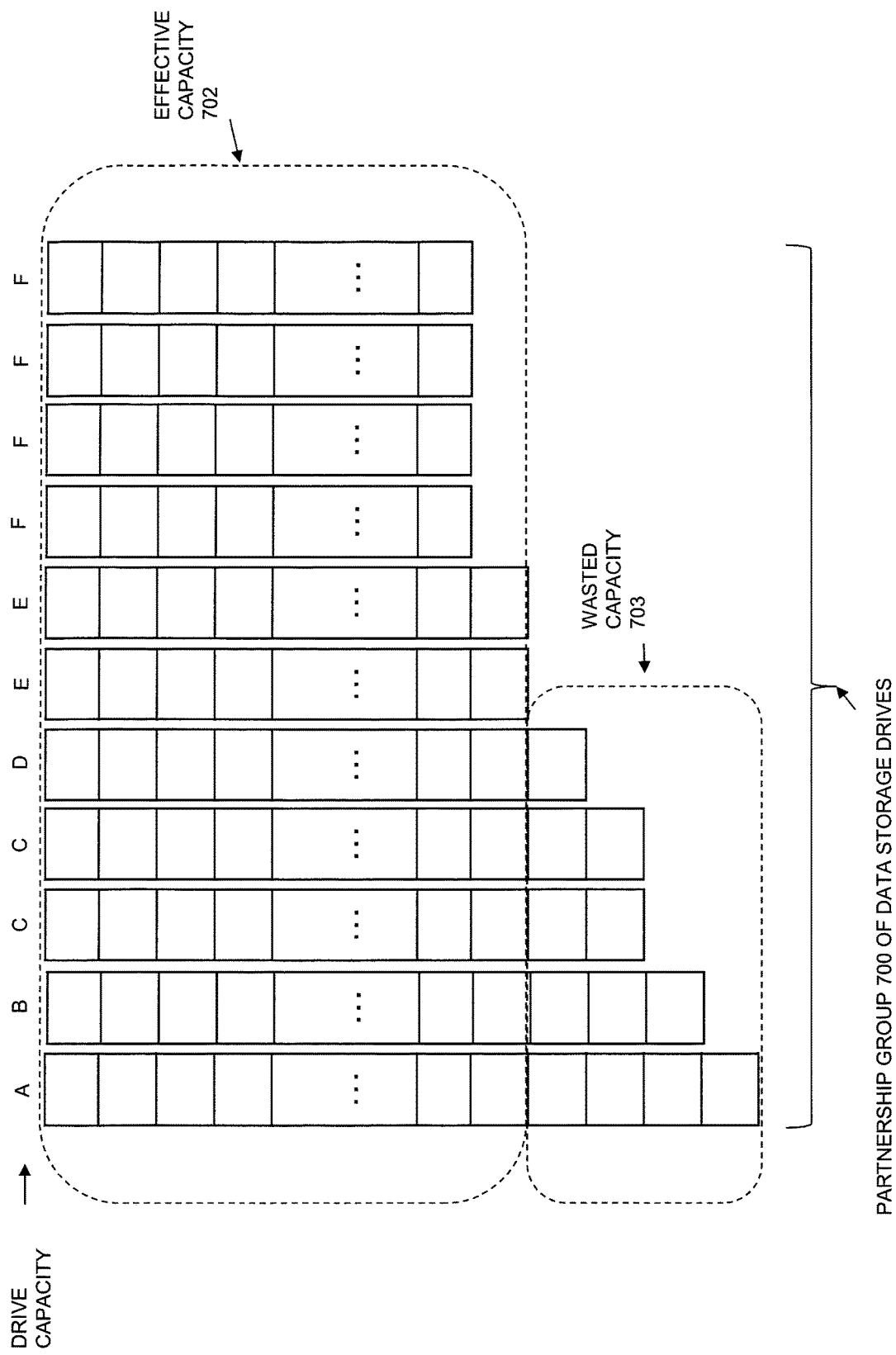
FIG. 7 is a block diagram showing an example of effective capacity in a partnership group of data storage drives.

FIG. 7 is a block diagram showing an example of Effective Capacity 702 in a Partnership Group 700 of data storage drives. In the example of FIG. 7, each data storage drive has a capacity indicated as either A, B, C, D, E or F, with A being the highest capacity, B being the next highest capacity, C being the next highest capacity, and so on through F, which is the lowest capacity. Specifically, one data storage drive has capacity A, one data storage drive has capacity B, two data storage drives have capacity C, one data storage drive has capacity D, two data storage drives have capacity E, and four data storage drives have capacity F. In an example in which the minimum number of data storage drives that is required to provide RAID protection for the storage object is six, the Effective Capacity 702 of the data storage drives is limited to the capacity E, per the steps shown in FIG. 6, since SUM would not be at least six until after adding the two data storage drive with capacity E to SUM. As a result, the capacity greater than capacity E in the data storage drives having capacities A, B, C, and D is wasted, as shown by Wasted Capacity 703.

Figure 8:
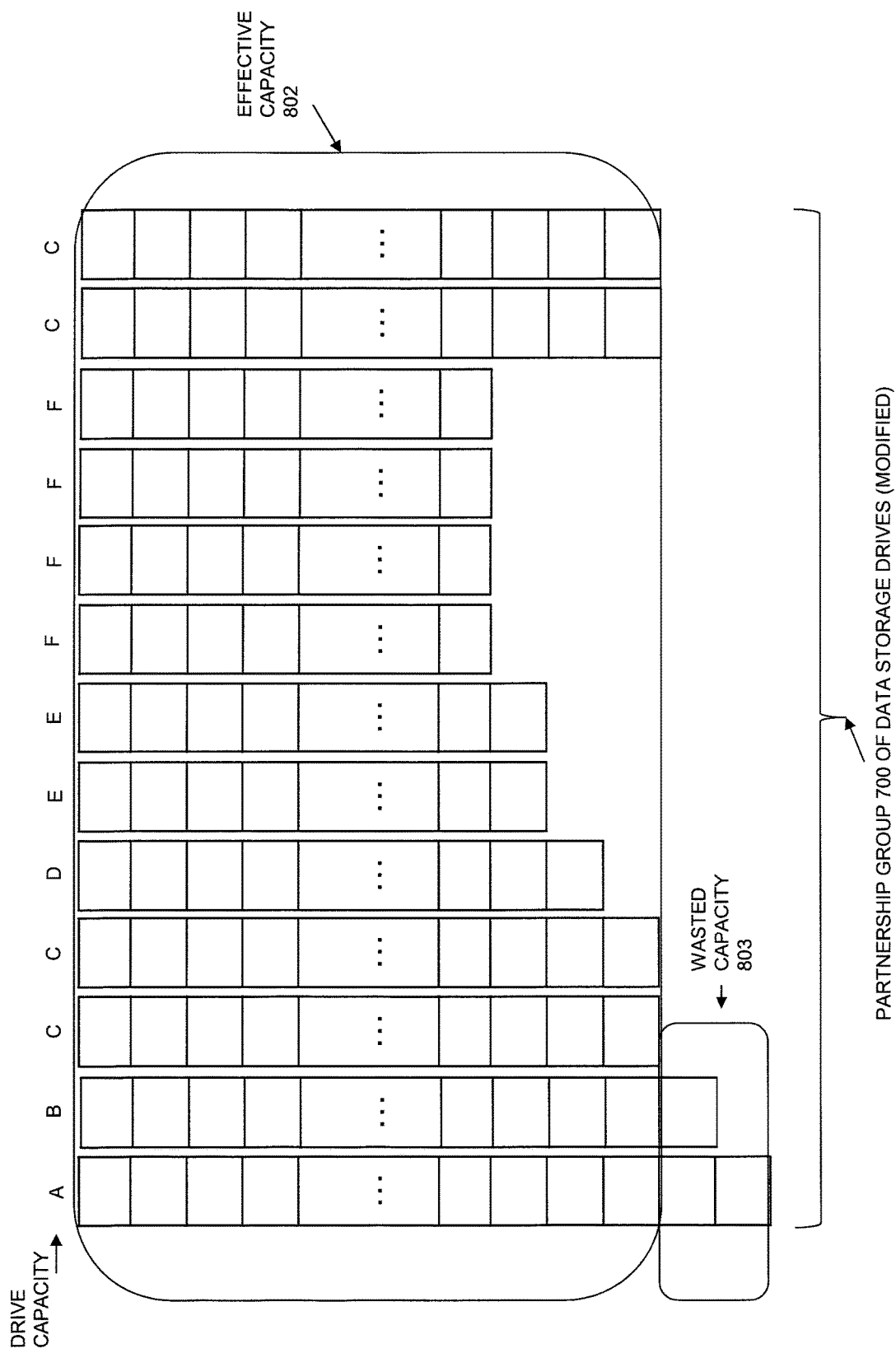
FIG. 8 is a block diagram showing an example of the effective capacity of the partnership group of data storage drives shown in FIG. 7 after the addition of two new data storage drives.

FIG. 8 is a block diagram showing an example of the effective capacity of the Partnership Group 700 of data storage drives shown in FIG. 7 after the addition of two new data storage drives having capacity C. As shown in FIG. 8, the Effective Capacity 802 of the modified Partnership Group 700 is larger than the Effective Capacity 702 in FIG. 7, and the Wasted Capacity 803 is smaller than the Wasted Capacity 703 shown in FIG. 7. However, because the value of SUM only became equal to the minimum number of data storage drives required to provide RAID protection to the storage object after the data storage drives having capacity C were added to SUM, the capacities of data storage drives having capacity A and capacity B are wasted above capacity C.

Figure 9:
FIG. 9 is a table showing an example of the capacity distributions in an original partnership group of data storage drives and a set of new data storage drives.

FIG. 9 is a Table 900 showing an example of the capacity distributions in an original partnership group of data storage drives and a set of new data storage drives. In the example of FIG. 9, the original partnership group includes five data storage drives of Disk Type A, each of which has a total capacity of 3 TB, 30 data storage drives of Disk Type B, each of which has a total capacity of 2 TB, 10 data storage drives of Disk Type C, each of which has a total capacity of 1 TB, and 10 data storage drives of Disk Type D, each of which has a total capacity of 500 GB. Further in the example of FIG. 9, the set of new data storage drives includes 7 data storage drives of Disk Type A, each of which has a total capacity of 3 TB, 10 data storage drives of Disk Type B, each of which has a total capacity of 2 TB, 10 data storage drives of Disk Type C, each of which has a total capacity of 1 TB, and 10 data storage drives of Disk Type D, each of which has a total capacity of 500 GB. In the example of FIG. 9, the highest capacity data storage drives in the original partnership group and the highest capacity data storage drives in the set of new data storage drives each have the same capacity, e.g. 3 TB.

FIG. 10 is a block diagram further illustrating the example of the original partnership group and the set of new data storage drives described by the Table 900 shown in FIG. 9. FIG. 10 shows the original partnership group described in the Table 900 of FIG. 9 as Original Partnership Group 1000, and the set of new data storage drives described in the Table 900 of FIG. 9 as Set of New Data Storage Drives 1004. FIG. 10 shows that the Original Partnership Group 1000, prior to adding any data storage drives from the Set of New Data Storage Drives 1004, includes wasted capacity 1001 in the five data storage drives of Disk Type A. The Original Partnership Group 1000 is further shown having an effective capacity 1002.

FIG. 11 is a block diagram illustrating an example of how the data storage drives in the Set of New Data Storage Drives 1004 may be assigned to Original Partnership Group 1000 of FIG. 10, and to a New Partnership Group 1102 that is created with the data storage drives in the Set of New Data Storage Drives 1004 that are not added to Original Partnership Group 1000. In the example of FIG. 11, the minimum number of data storage drives required to provide RAID protection for the storage object is six. Accordingly, since the number of highest capacity drives (the Type A drives) in Original Partnership Group 1000 (prior to the addition of any data storage drives from the Set of New Data Storage Drives 1004) was five, the number of the highest capacity drives in the Original Partnership Group 1000 was less than the minimum number of data storage drives required to provide RAID protection for the storage object. Since the sum of the total number of highest capacity drives in the Original Partnership Group 1000 prior to modification and the total number of highest capacity drives in the Set of New Data Storage Drives 1004 was twelve (five Type A drives from the Original Partnership Group 1000 plus seven Type A drives from the Set of New Data Storage Drives 1004), the sum of the total number of highest capacity drives in the Original Partnership Group 1000 and the total number of highest capacity drives in the Set of New Data Storage Drives 1004 was at least as large as double the minimum number of data storage drives required to provide RAID protection for the storage object. Accordingly, FIG. 11 shows the results of the disclosed technology adding Type A drives to the Original Partnership Group 1000 from the Set of New Data Storage Drives 1004 until the total number of Type A drives in the Original Partnership Group 1000 is equal to the minimum number of data storage drives required to provide RAID data protection for the storage object, e.g. until the number of Type A drives in the Original Partnership Group 100 is equal to six. Further in the example of FIG. 11, the maximum partnership group size is sixty four. Accordingly, FIG. 11 also shows the results of the disclosed technology adding drives to the Original Partnership Group 1000 from the Set of New Data Storage Drives 1004 in ascending order of capacity, starting with the lowest capacity drives in Set of New Data Storage Drives 1004 (e.g. starting with the Type D drives), until the total number of data storage drives in the Original Partnership Group 1000 is equal to the maximum partnership group size (e.g. until the total number of drives in Original Partnership Group 1000 is sixty four). As shown in FIG. 11, eight Type D drives were added to the Original Partnership Group 1000 from the Set of New Data Storage Drives 1004, at which point the total number of data storage drives in the Original Partnership Group 1000 became equal to the maximum partnership group size of sixty four. The New Partnership Group 1102 shown in FIG. 11 is made up of those data storage drives in the Set of New Data Storage Drives 1004 that were not added to the Original Partnership Group 1000. The disclosed technology further creates a new RAID extent group corresponding to the New Partnership Group 1002 in the RAID mapping table, such that all RAID extents contained in the new RAID extent group only indicate drive extents that are located on data storage drives that are contained in the New Partnership Group 1102.

As shown in FIG. 11, because the resulting number of Type A drives in the Original Partnership Group 1000, and the number of Type A drives in the New Partnership Group 1102, are both at least as large as the minimum number of data storage drives required to provide RAID protection for the storage object, the effective capacity 1101 of the Original Partnership Group 1000 advantageously includes the total capacity of all data storage drives contained in the Original Partnership Group 1000, and the effective capacity 1103 of the New Partnership Group 1102 advantageously includes the total capacity of all data storage drives contained in the New Partnership Group 1102.

Figure 12:
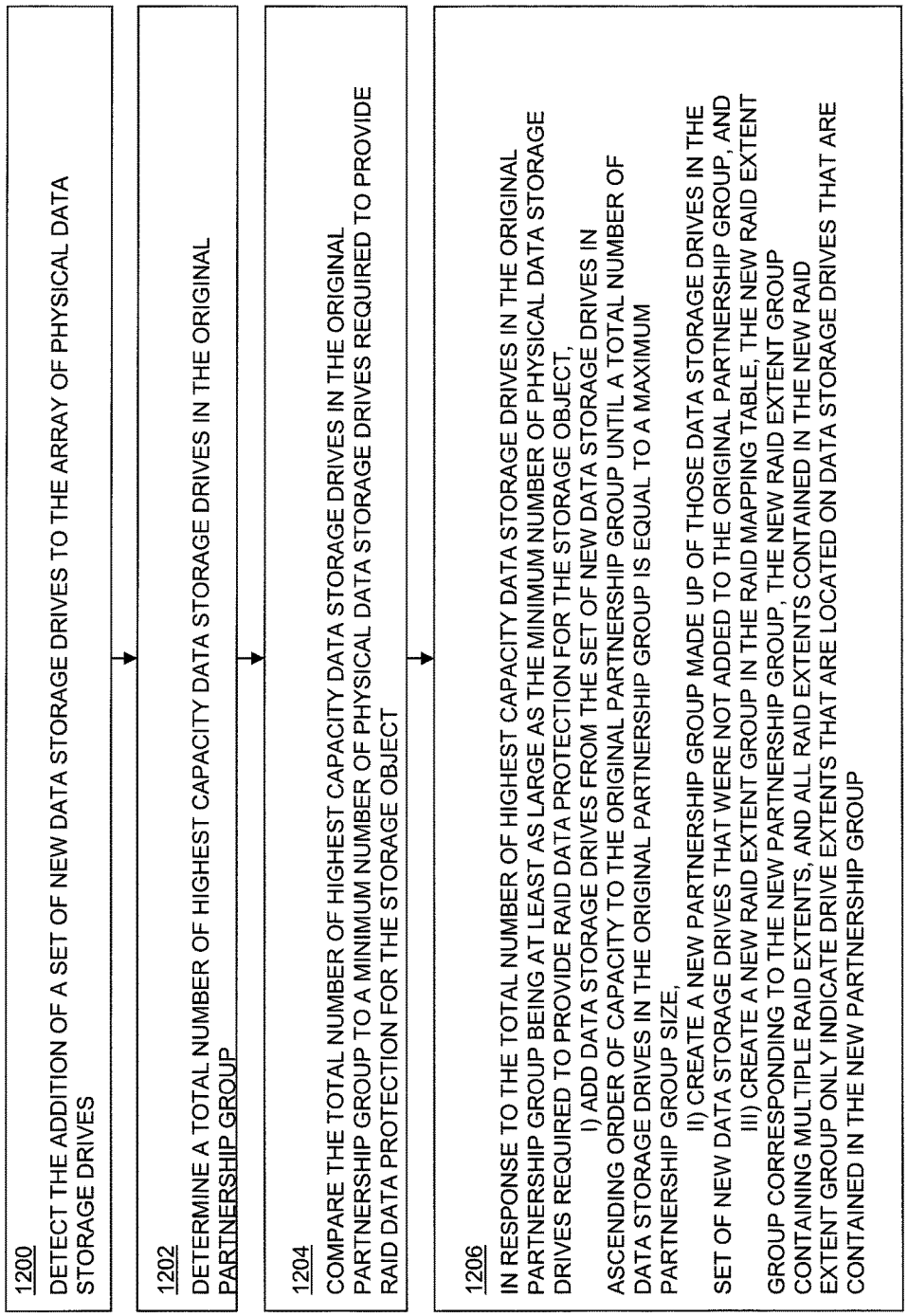
FIG. 12 is a flow chart showing steps performed during operation of some embodiments.

FIG. 12 is a flow chart showing steps performed during operation of some embodiments. The steps of FIG. 12 may, for example, be performed by the Host I/O Processing Logic 135 shown in FIG. 1.

At step 1200, the addition of a set of new data storage drives to the array of physical data storage drives is detected.

At step 1202, a total number of highest capacity data storage drives in the original partnership group is determined.

At step 1204, the total number of highest capacity data storage drives in the original partnership group is compared to a minimum number of physical data storage drives required to provide RAID data protection for the storage object.

At step 1206, in response to detecting that the total number of highest capacity data storage drives in the original partnership group is at least as large as the minimum number of physical data storage drives required to provide RAID data protection for the storage object, i) data storage drives are added from the set of new data storage drives in ascending order of capacity to the original partnership group until a total number of data storage drives in the original partnership group is equal to a maximum partnership group size, ii) a new partnership group is created that is made up of those data storage drives in the set of new data storage drives that were not added to the original partnership group, and iii) a new RAID extent group is created in the RAID mapping table, the new RAID extent group corresponding to the new partnership group, the new RAID extent group containing multiple RAID extents, and all RAID extents contained in the new RAID extent group only indicate drive extents that are located on data storage drives that are contained in the new partnership group.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, without limitation, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms, including without limitation: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing RAID (Redundant Array of Independent Disks) data protection for a storage object in a data storage system, wherein the data storage system includes a storage processor and an array of data storage drives communicably coupled to the storage processor, wherein the array of data storage drives includes an original partnership group of data storage drives, the method comprising:

generating a RAID mapping table, wherein the RAID mapping table contains a plurality of RAID extents, wherein each RAID extent contained in the RAID mapping table indicates a predetermined total number of drive extents that each persistently store host data written to the storage object, and wherein each drive extent comprises a contiguous region of non-volatile data storage located on one of the data storage drives, wherein the RAID mapping table contains an original RAID extent group corresponding to the original partnership group, wherein the original RAID extent group contains a plurality of RAID extents, and wherein all RAID extents contained in the original RAID extent group only indicate drive extents that are located on data storage drives that are contained in the original partnership group;

detecting the addition of a set of new data storage drives to the array of data storage drives;

determining a total number of highest capacity data storage drives in the original partnership group;

comparing the total number of highest capacity data storage drives in the original partnership group to a minimum number of data storage drives required to provide RAID data protection for the storage object; and in response to the total number of highest capacity data storage drives in the original partnership group being at least as large as the minimum number of data storage drives required to provide RAID data protection for the storage object,
  i) adding data storage drives from the set of new data storage drives in ascending order of capacity to the original partnership group until a total number of data storage drives in the original partnership group is equal to a maximum partnership group size,
  ii) creating a new partnership group made up of those data storage drives in the set of new data storage drives that were not added to the original partnership group, and
  iii) creating a new RAID extent group in the RAID mapping table, the new RAID extent group corresponding to the new partnership group, wherein the new RAID extent group contains a plurality of RAID extents, and wherein all RAID extents contained in the new RAID extent group only indicate drive extents that are located on data storage drives that are contained in the new partnership group.

2. The method of claim 1, wherein the highest capacity data storage drives in the original partnership group and the highest capacity data storage drives in the set of new data storage drives each have the same capacity, and further comprising, in response to the total number of highest capacity data storage drives in the original partnership group being less than the minimum number of data storage drives required to provide RAID data protection for the storage object:

determining a total number of highest capacity data storage drives in the set of new data storage drives;

comparing a sum of the total number of highest capacity data storage drives in the original partnership group and the total number of highest capacity data storage drives in the set of new data storage drives to double the minimum number of data storage drives required to provide RAID data protection for the storage object;

determining whether a number of new data storage drives can be added to the original partnership group that is equal to a difference between the total number of highest capacity data storage drives in the original partnership group and the minimum number of data storage drives required to provide RAID data protection for the storage object without a total number of data storage drives in the original partnership group exceeding a maximum partnership group size; and in response to the sum of the total number of highest capacity data storage drives in the original partnership group and the total number of highest capacity data storage drives in the set of new data storage drives being at least as large as double the minimum number of data storage drives required to provide RAID data protection for the storage object, and to a determination that a number of new data storage drives can be added to the original partnership group that is equal to the difference between the total number of highest capacity data storage drives in the original partnership group and the minimum number of data storage drives required to provide RAID data protection for the storage object without the total number of data storage drives in the original partnership group exceeding the maximum partnership group size,
  i) adding highest capacity data storage drives from the set of new data storage drives to the original partnership group until the total number of highest capacity data storage drives in the original partnership group is equal to the minimum number of data storage drives required to provide RAID data protection for the storage object,
  ii) creating a new partnership group made up of those data storage drives in the set of new data storage drives that were not added to the original partnership group, and
  iii) creating a new RAID extent group in the RAID mapping table, the new RAID extent group corresponding to the new partnership group, wherein the new RAID extent group contains a plurality of RAID extents, and wherein all RAID extents contained in the new RAID extent group only indicate drive extents that are located on data storage drives that are contained in the new partnership group.

3. The method of claim 1, wherein the highest capacity data storage drives in the original partnership group and the highest capacity data storage drives in the set of new data storage drives each have the same capacity, and further comprising, in response to the total number of highest capacity data storage drives in the original partnership group being less than the minimum number of data storage drives required to provide RAID data protection for the storage object and to the sum of the total number of highest capacity data storage drives in the original partnership group and the total number of highest capacity data storage drives in the set of new data storage drives being less than double the minimum number of data storage drives required to provide RAID data protection for the storage object:

comparing the sum of the total number of highest capacity data storage drives in the original partnership group and the total number of highest capacity data storage drives in the set of new data storage drives to the minimum number of data storage drives required to provide RAID data protection for the storage object;

determining whether a number of new data storage drives can be added to the original partnership group that is equal to a difference between the total number of highest capacity data storage drives in the original partnership group and the minimum number of data storage drives required to provide RAID data protection for the storage object without a total number of data storage drives in the original partnership group exceeding a maximum partnership group size; and in response to the sum of the total number of highest capacity data storage drives in the original partnership group and the total number of highest capacity data storage drives in the set of new data storage drives being at least as large as the minimum number of data storage drives required to provide RAID data protection for the storage object, and to a determination that a number of new data storage drives can be added to the original partnership group that is equal to the difference between the total number of highest capacity data storage drives in the original partnership group and the minimum number of data storage drives required to provide RAID data protection for the storage object without the total number of data storage drives in the original partnership group exceeding the maximum partnership group size, i) adding data storage drives from the set of new data storage drives in descending order of capacity to the original partnership group until a total number of data storage drives in the original partnership group is equal to a maximum partnership group size, ii) creating a new partnership group made up of those data storage drives in the set of new data storage drives that were not added to the original partnership group, and iii) creating a new RAID extent group in the RAID mapping table, the new RAID extent group corresponding to the new partnership group, wherein the new RAID extent group contains a plurality of RAID extents, and wherein all RAID extents contained in the new RAID extent group only indicate drive extents that are located on data storage drives that are contained in the new partnership group.

4. The method of claim 3, further comprising, in response to the total number of highest capacity data storage drives in the original partnership group being less than the minimum number of data storage drives required to provide RAID data protection for the storage object and to the sum of the total number of highest capacity data storage drives in the original partnership group and the total number of highest capacity data storage drives in the set of new data storage drives being less than the minimum number of data storage drives required to provide RAID data protection for the storage object:

adding data storage drives from the set of new data storage drives in ascending order of capacity to the original partnership group until a total number of data storage drives in the original partnership group is equal to a maximum partnership group size;

creating a new partnership group made up of those data storage drives in the set of new data storage drives that were not added to the original partnership group; and creating a new RAID extent group in the RAID mapping table, the new RAID extent group corresponding to the new partnership group, wherein the new RAID extent group contains a plurality of RAID extents, and wherein all RAID extents contained in the new RAID extent group only indicate drive extents that are located on data storage drives that are contained in the new partnership group.

5. The method of claim 3, further comprising, in response to the total number of highest capacity data storage drives in the original partnership group being less than the minimum number of data storage drives required to provide RAID data protection for the storage object and to a determination that a number of new data storage drives cannot be added to the original partnership group that is equal to the difference between the total number of highest capacity data storage drives in the original partnership group and the minimum number of data storage drives required to provide RAID data protection for the storage object without the total number of data storage drives in the original partnership group exceeding the maximum partnership group size:

adding data storage drives from the set of new data storage drives in ascending order of capacity to the original partnership group until a total number of data storage drives in the original partnership group is equal to a maximum partnership group size;

creating a new partnership group made up of those data storage drives in the set of new data storage drives that were not added to the original partnership group; and creating a new RAID extent group in the RAID mapping table, the new RAID extent group corresponding to the new partnership group, wherein the new RAID extent group contains a plurality of RAID extents, and wherein all RAID extents contained in the new RAID extent group only indicate drive extents that are located on data storage drives that are contained in the new partnership group.

6. The method of claim 5, wherein the minimum number of data storage drives required to provide RAID data protection for the storage object is greater than the total number of drive extents indicated by each RAID extent in the RAID mapping table; and wherein the maximum drive group size is at least twice as large as the minimum number of data storage drives required to provide RAID data protection for the storage object.

7. The method of claim 5, wherein the minimum number of data storage drives required to provide RAID data protection for the storage object is equal to the total number of drive extents indicated by each RAID extent in the RAID mapping table; and wherein the maximum drive group size is at least twice as large as the minimum number of data storage drives required to provide RAID data protection for the storage object.

8. The method of claim 5, wherein a plurality of unallocated drive extents located on the data storage drives contained in the original partnership group are available as free drive extents to be allocated, in response to detecting a failure of one of the data storage drives contained in the original partnership group, to one or more RAID extents in the original RAID extent group, to replace drive extents located on the failed data storage drive contained in the original partnership group; and wherein a plurality of unallocated drive extents located on the data storage drives contained in the new partnership group are available as free drive extents to be allocated, in response to detecting a failure of a data storage drive contained in the new partnership group, to one or more RAID extents in the new RAID extent group, to replace drive extents located on the failed data storage drive contained in the new partnership group.

9. The method of claim 8, wherein drive extents are allocated to RAID extents in the RAID mapping table such that no two drive extents indicated by any single RAID extent are located on the same data storage drive.

10. The method of claim 1, wherein determining the total number of highest capacity data storage drives in the original partnership group comprises: determining the total capacity of each one of the data storage drives in the original partnership group; and counting the number of data storage drives having the highest capacity in the original partnership group.

11. A data storage system that provides RAID (Redundant Array of Independent Disks) data protection for a storage object, comprising:

at least one storage processor including processing circuitry and a memory;

an array of data storage drives communicably coupled to the storage processor, wherein the array of data storage drives includes an original partnership group of data storage drives; and wherein the memory has program code stored thereon, wherein the program code, when executed by the processing circuitry, causes the processing circuitry to:

generate a RAID mapping table, wherein the RAID mapping table contains a plurality of RAID extents, wherein each RAID extent contained in the RAID mapping table indicates a predetermined total number of drive extents that each persistently store host data written to the storage object, and wherein each drive extent comprises a contiguous region of non-volatile data storage located on one of the data storage drives, wherein the RAID mapping table contains an original RAID extent group corresponding to the original partnership group, wherein the original RAID extent group contains a plurality of RAID extents, and wherein all RAID extents contained in the original RAID extent group only indicate drive extents that are located on data storage drives that are contained in the original partnership group, detect the addition of a set of new data storage drives to the array of data storage drives, determine a total number of highest capacity data storage drives in the original partnership group, compare the total number of highest capacity data storage drives in the original partnership group to a minimum number of data storage drives required to provide RAID data protection for the storage object, and in response to the total number of highest capacity data storage drives in the original partnership group being at least as large as the minimum number of data storage drives required to provide RAID data protection for the storage object, i) add data storage drives from the set of new data storage drives in ascending order of capacity to the original partnership group until a total number of data storage drives in the original partnership group is equal to a maximum partnership group size, ii) create a new partnership group made up of those data storage drives in the set of new data storage drives that were not added to the original partnership group, and iii) create a new RAID extent group in the RAID mapping table, the new RAID extent group corresponding to the new partnership group, wherein the new RAID extent group contains a plurality of RAID extents, and wherein all RAID extents contained in the new RAID extent group only indicate drive extents that are located on data storage drives that are contained in the new partnership group.

12. The data storage system of claim 11, wherein the highest capacity data storage drives in the original partnership group and the highest capacity data storage drives in the set of new data storage drives each have the same capacity, and wherein the program code, when executed by the processing circuitry, in response to the total number of highest capacity data storage drives in the original partnership group being less than the minimum number of data storage drives required to provide RAID data protection for the storage object, further causes the processing circuitry to:

determine a total number of highest capacity data storage drives in the set of new data storage drives;

compare a sum of the total number of highest capacity data storage drives in the original partnership group and the total number of highest capacity data storage drives in the set of new data storage drives to double the minimum number of data storage drives required to provide RAID data protection for the storage object;

determine whether a number of new data storage drives can be added to the original partnership group that is equal to a difference between the total number of highest capacity data storage drives in the original partnership group and the minimum number of data storage drives required to provide RAID data protection for the storage object without a total number of data storage drives in the original partnership group exceeding a maximum partnership group size; and in response to the sum of the total number of highest capacity data storage drives in the original partnership group and the total number of highest capacity data storage drives in the set of new data storage drives being at least as large as double the minimum number of data storage drives required to provide RAID data protection for the storage object, and to a determination that a number of new data storage drives can be added to the original partnership group that is equal to the difference between the total number of highest capacity data storage drives in the original partnership group and the minimum number of data storage drives required to provide RAID data protection for the storage object without the total number of data storage drives in the original partnership group exceeding the maximum partnership group size, i) add highest capacity data storage drives from the set of new data storage drives to the original partnership group until the total number of highest capacity data storage drives in the original partnership group is equal to the minimum number of data storage drives required to provide RAID data protection for the storage object, ii) create a new partnership group made up of those data storage drives in the set of new data storage drives that were not added to the original partnership group, and iii) create a new RAID extent group in the RAID mapping table, the new RAID extent group corresponding to the new partnership group, wherein the new RAID extent group contains a plurality of RAID extents, and wherein all RAID extents contained in the new RAID extent group only indicate drive extents that are located on data storage drives that are contained in the new partnership group.

13. The data storage system of claim 11, wherein the highest capacity data storage drives in the original partnership group and the highest capacity data storage drives in the set of new data storage drives each have the same capacity, and wherein the program code, when executed by the processing circuitry, in response to the total number of highest capacity data storage drives in the original partnership group being less than the minimum number of data storage drives required to provide RAID data protection for the storage object and to the sum of the total number of highest capacity data storage drives in the original partnership group and the total number of highest capacity data storage drives in the set of new data storage drives being less than double the minimum number of data storage drives required to provide RAID data protection for the storage object, further causes the processing circuitry to:
 compare the sum of the total number of highest capacity data storage drives in the original partnership group and the total number of highest capacity data storage drives in the set of new data storage drives to the minimum number of data storage drives required to provide RAID data protection for the storage object;
 determine whether a number of new data storage drives can be added to the original partnership group that is equal to a difference between the total number of highest capacity data storage drives in the original partnership group and the minimum number of data storage drives required to provide RAID data protection for the storage object without a total number of data storage drives in the original partnership group exceeding a maximum partnership group size; and
 in response to the sum of the total number of highest capacity data storage drives in the original partnership group and the total number of highest capacity data storage drives in the set of new data storage drives being at least as large as the minimum number of data storage drives required to provide RAID data protection for the storage object, and to a determination that a number of new data storage drives can be added to the original partnership group that is equal to the difference between the total number of highest capacity data storage drives in the original partnership group and the minimum number of data storage drives required to provide RAID data protection for the storage object without the total number of data storage drives in the original partnership group exceeding the maximum partnership group size,
  i) add data storage drives from the set of new data storage drives in descending order of capacity to the original partnership group until a total number of data storage drives in the original partnership group is equal to a maximum partnership group size,
  ii) create a new partnership group made up of those data storage drives in the set of new data storage drives that were not added to the original partnership group, and
  iii) create a new RAID extent group in the RAID mapping table, the new RAID extent group corresponding to the new partnership group, wherein the new RAID extent group contains a plurality of RAID extents, and wherein all RAID extents contained in the new RAID extent group only indicate drive extents that are located on data storage drives that are contained in the new partnership group.

14. The data storage system of claim 13, wherein the program code, when executed by the processing circuitry, in response to the total number of highest capacity data storage drives in the original partnership group being less than the minimum number of data storage drives required to provide RAID data protection for the storage object and to the sum of the total number of highest capacity data storage drives in the original partnership group and the total number of highest capacity data storage drives in the set of new data storage drives being less than the minimum number of data storage drives required to provide RAID data protection for the storage object, further causes the processing circuitry to:
 add data storage drives from the set of new data storage drives in ascending order of capacity to the original partnership group until a total number of data storage drives in the original partnership group is equal to a maximum partnership group size;
 create a new partnership group made up of those data storage drives in the set of new data storage drives that were not added to the original partnership group; and
 create a new RAID extent group in the RAID mapping table, the new RAID extent group corresponding to the new partnership group, wherein the new RAID extent group contains a plurality of RAID extents, and wherein all RAID extents contained in the new RAID extent group only indicate drive extents that are located on data storage drives that are contained in the new partnership group.

15. The data storage system of claim 13, wherein the program code, when executed by the processing circuitry, in response to the total number of highest capacity data storage drives in the original partnership group being less than the minimum number of data storage drives required to provide RAID data protection for the storage object and to a determination that a number of new data storage drives cannot be added to the original partnership group that is equal to the difference between the total number of highest capacity data storage drives in the original partnership group and the minimum number of data storage drives required to provide RAID data protection for the storage object without the total number of data storage drives in the original partnership group exceeding the maximum partnership group size, further causes the processing circuitry to:
 add data storage drives from the set of new data storage drives in ascending order of capacity to the original partnership group until a total number of data storage drives in the original partnership group is equal to a maximum partnership group size;
 create a new partnership group made up of those data storage drives in the set of new data storage drives that were not added to the original partnership group; and
 create a new RAID extent group in the RAID mapping table, the new RAID extent group corresponding to the new partnership group, wherein the new RAID extent group contains a plurality of RAID extents, and wherein all RAID extents contained in the new RAID extent group only indicate drive extents that are located on data storage drives that are contained in the new partnership group.

16. The data storage system of claim 15, wherein the minimum number of data storage drives required to provide RAID data protection for the storage object is greater than the total number of drive extents indicated by each RAID extent in the RAID mapping table; and
 wherein the maximum drive group size is at least twice as large as the minimum number of data storage drives required to provide RAID data protection for the storage object.

17. The data storage system of claim 15, wherein the minimum number of data storage drives required to provide RAID data protection for the storage object is equal to the total number of drive extents indicated by each RAID extent in the RAID mapping table; and wherein the maximum drive group size is at least twice as large as the minimum number of data storage drives required to provide RAID data protection for the storage object.

18. The data storage system of claim 15, wherein a plurality of unallocated drive extents located on the data storage drives contained in the original partnership group are available as free drive extents to be allocated, in response to detection of a failure of one of the data storage drives contained in the original partnership group, to one or more RAID extents in the original RAID extent group, to replace drive extents located on the failed data storage drive contained in the original partnership group; and wherein a plurality of unallocated drive extents located on the data storage drives contained in the new partnership group are available as free drive extents to be allocated, in response to detection of a failure of a data storage drive contained in the new partnership group, to one or more RAID extents in the new RAID extent group, to replace drive extents located on the failed data storage drive contained in the new partnership group.

19. The data storage system of claim 18, wherein drive extents are allocated to RAID extents in the RAID mapping table such that no two drive extents indicated by any single RAID extent are located on the same data storage drive.

20. A non-transitory computer readable medium for providing RAID (Redundant Array of Independent Disks) data protection for a storage object in a data storage system, wherein the data storage system includes a storage processor and an array of data storage drives communicably coupled to the storage processor, wherein the array of data storage drives includes an original partnership group of data storage drives, the non-transitory computer readable medium comprising instructions stored thereon that when executed on processing circuitry in the storage processor perform the steps of:

generating a RAID mapping table, wherein the RAID mapping table contains a plurality of RAID extents, wherein each RAID extent contained in the RAID mapping table indicates a predetermined total number of drive extents that each persistently store host data written to the storage object, and wherein each drive extent comprises a contiguous region of non-volatile data storage located on one of the data storage drives, wherein the RAID mapping table contains an original RAID extent group corresponding to the original partnership group, wherein the original RAID extent group contains a plurality of RAID extents, and wherein all RAID extents contained in the original RAID extent group only indicate drive extents that are located on data storage drives that are contained in the original partnership group;

detecting the addition of a set of new data storage drives to the array of data storage drives;

determining a total number of highest capacity data storage drives in the original partnership group;

comparing the total number of highest capacity data storage drives in the original partnership group to a minimum number of data storage drives required to provide RAID data protection for the storage object; and in response to the total number of highest capacity data storage drives in the original partnership group being at least as large as the minimum number of data storage drives required to provide RAID data protection for the storage object, i) adding data storage drives from the set of new data storage drives in ascending order of capacity to the original partnership group until a total number of data storage drives in the original partnership group is equal to a maximum partnership group size, ii) creating a new partnership group made up of those data storage drives in the set of new data storage drives that were not added to the original partnership group, and iii) creating a new RAID extent group in the RAID mapping table, the new RAID extent group corresponding to the new partnership group, wherein the new RAID extent group contains a plurality of RAID extents, and wherein all RAID extents contained in the new RAID extent group only indicate drive extents that are located on data storage drives that are contained in the new partnership group.

* * * * *